US011936592B2

United States Patent
Awad et al.

(10) Patent No.: US 11,936,592 B2
(45) Date of Patent: *Mar. 19, 2024

(54) APPARATUS AND METHODS FOR COMMUNICATING CONTROL RESOURCE SET DATA

(71) Applicant: NEC Corporation, Tokyo (JP)

(72) Inventors: Yassin Aden Awad, Tokyo (JP); Chadi Khirallah, Tokyo (JP); Jagdeep Singh Ahluwalia, Tokyo (JP); Robert Arnott, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,050

(22) Filed: Mar. 8, 2023

(65) Prior Publication Data
US 2023/0291530 A1 Sep. 14, 2023

Related U.S. Application Data

(63) Continuation of application No. 16/495,445, filed as application No. PCT/JP2018/011290 on Mar. 22, 2018, now Pat. No. 11,632,221.

(30) Foreign Application Priority Data

Mar. 24, 2017 (GB) ...................... 1704762

(51) Int. Cl.
*H04L 5/00* (2006.01)
*H04B 7/0408* (2017.01)
(Continued)

(52) U.S. Cl.
CPC ......... *H04L 5/0087* (2013.01); *H04B 7/0408* (2013.01); *H04L 5/0007* (2013.01);
(Continued)

(58) Field of Classification Search
CPC ... H04L 5/0087; H04L 5/0007; H04L 5/0042; H04L 5/0044; H04L 5/0053;
(Continued)

(56) References Cited

U.S. PATENT DOCUMENTS 9,253,770 B2    2/2016  Yang ................. H04W 72/0453
11,632,221 B2 * 4/2023  Awad .................... H04L 5/0007
                                                 370/330

(Continued)

FOREIGN PATENT DOCUMENTS

CN    104247313 A    12/2014
CN    105612801 A    5/2016
(Continued)

OTHER PUBLICATIONS

NGMN, "5G white paper", (https://www.ngmn.org/5g-white-paper/5g-white-paper.html), pp. 1-2.
(Continued)

*Primary Examiner* — Omar J Ghowrwal
(74) *Attorney, Agent, or Firm* — Sughrue Mion, PLLC

(57) ABSTRACT

A communication system is disclosed in which a communication device and a base station initially communicate using a first bandwidth. The communication device monitors for control data transmitted, by the base station, using a first control resource set conveyed in the first bandwidth. The communication device and the base station switch to using a second bandwidth, wherein the second bandwidth is different to the first bandwidth, and the communication device monitors for control data transmitted, by the base station, using a second control resource set that is conveyed in the second bandwidth.

12 Claims, 9 Drawing Sheets

(51) Int. Cl.
*H04W 72/0453* (2023.01)
*H04W 72/23* (2023.01)
*H04W 28/20* (2009.01)

(52) U.S. Cl.
CPC .......... *H04L 5/0042* (2013.01); *H04L 5/0044* (2013.01); *H04L 5/0053* (2013.01); *H04L 5/0064* (2013.01); *H04L 5/0094* (2013.01); *H04W 72/0453* (2013.01); *H04W 72/23* (2023.01); *H04L 5/0012* (2013.01); *H04W 28/20* (2013.01)

(58) Field of Classification Search
CPC ... H04L 5/0064; H04L 5/0094; H04L 5/0012; H04B 7/0408; H04W 72/0453; H04W 72/23; H04W 28/20
See application file for complete search history.

(56) References Cited

U.S. PATENT DOCUMENTS

| | | | |
|---|---|---|---|
| 2011/0230225 A1 | 9/2011 | Yokoyama | |
| 2015/0312791 A1 | 10/2015 | Seo et al. | |
| 2018/0227777 A1 | 8/2018 | Sun | H04L 5/0053 |
| 2018/0279289 A1 | 9/2018 | Islam | H04W 72/0446 |
| 2020/0128585 A1 | 4/2020 | Kuang | H04L 5/0053 |

FOREIGN PATENT DOCUMENTS

| | | |
|---|---|---|
| CN | 105917598 A | 8/2016 |
| EP | 2302830 A2 | 3/2011 |
| WO | 2016/182391 A1 | 11/2016 |

OTHER PUBLICATIONS

Mediatek et al., "Way Forward on bandwidth adaptation in NR", 3GPP TSG-RAN WG1 #86bis, R1-1611041, Lisbon, Portugal, Oct. 10-14, 2016, pp. 1-4.
Mediatek Inc., "DL Control Channel Design for NR", 3GPP TSG RAN WG1 Meeding #87, R1-1612120, Reno, USA, Nov. 14-18, 2016, pp. 1-4.
Samsung, "Single Carrier Wide BW Operational Aspects", 3GPPP TSG RAN WG1 AR-Adhoc, R1-1700941, Spokane, US, Jan. 16-20, 2017, pp. 1-5.
Qualcomm Incorporated, "UE power saving for PDCCH monitoring", 3GPP TSG-RAN WG1 NR AdHoc, R1-1700817, Jan. 16-20, 2017, pp. 1-3, Spokane, U.S.A.
Ericsson, "RRM aspects of bandwidth adaptation", 3GPP TSG-RAN WG4 Meeting #82, R4-1700646, Athens, Greece, Feb. 13-17, 2017, pp. 1-8.
International Search Report of PCT/JP2018/011290 dated Aug. 13, 2018 [PCT/ISA/210].
Written Opinion of PCT/JP2018/011290 dated Aug. 13, 2018 [PCT/ISA/237].
NTT DOCOMO, Inc., "Monitoring of DL control channel for NR", 3GPP TSG RAN WG1 Meeting #87, R1-1612716, Reno, USA, Nov. 14-18, 2016 (5 pages Total).
Panasonic, "Configuration of DL control resource set and UE bandwidth", 3GPP TSG-RAN WG1 NR AdHoc, R1-1700639, Jan. 16-20, 2017, Spokane, USA (5 Pages total).
Communication dated Oct. 20, 2020, from the Japanese Patent Office in Application No. 2019-552636.
LG Electronics, 3GPP TSG RAN WG1 Meeting #88, R1-1702582, "Discussion on bandwidth adaptation", Feb. 13-17, 2017, Greece.
NTT DOCOMO, Inc., 3GPP TSG RAN WG1 Meeting #88, R1-1702809, "Search space design for NR-PDDCH", Feb. 13-17, 2017, pp. 1-5, Greece.
NTT DOCOMO, 3GPP TSG RAN WIG1 Meeting #87, R1-1612717, "Discussion on multiple-step DCI for NR", Nov. 14-18, 2016, pp. 1-3, USA.
InterDigital Communications, 3GPP TSG RAN WG1 AH_NR Meeting, R1-1700704, "Downlink Control Channel Framework", Jan. 16-20, 2017, pp. 1-4,USA.
CATT, 3GPP TSG RAN WG1 Meeting #88, R1-1702092, "NR DL control channel structure", Feb. 13-17, 2017, Greece.
Panasonic, 3GPP TSG-RAN WG1 Meeting #88, R1-1703279, "Control Signalling design on downlink resource allocation", Feb. 13-27, 2017, p. 1-4, Greece.
Huawei et al., 3GPP TSG-RAN WG1 Meeting #88, R1-1701641, "Two-stage downlink control structure", Feb. 13-17, 2017, Greece.
Panasonic, 3GPP TSG RAN WG1 Meeting #88, R1-1702309, "Discussion on flexible bandwidth operation in NR", Feb. 13-17, 2017, pp. 1-3, Greece.
NTT DOCOMO, Inc., 3GPP TSG RAN WG1 Meeting #88, R1-1702807, "Views on PDDCH", Feb. 13-17, 2017, pp. 1-5, Greece.
Ericsson, 3GPP TSG-RAN WG1 #88, R1-1703291, "On Control Channel Design for Bandwidth Adaptation", Feb. 13-17, 2017, pp. 1-3, Greece.
NEC, 3GPP TSG-RAN WG1 Meeting #88bis, R1-1704650, "Downlink Control channel structure for NR", Apr. 3-7, 2017, pp. 1-4,USA.
Chinese Office Action for CN Application No. 201880020803.X dated Jul. 27, 2021 with English Translation.
NEC, "DL Control Channel Design for NR", 3GPP TSG-RAN WG1 Meeting #87, R1-1611721, Nov. 14-18, 2016, USA.
Nokia et al., "On two-level DL control channel design for shorter TTI operation", 3GPP TSG-RAN WG1 Meeting #87, R1-1612210, Nov, 14-18, 2016, USA.
EP Office Action for EP Application No. 18716375.3 dated Aug. 20, 2021.
3GPP technical report (TR) 23.799 V0.7.0 (Aug. 2016), Technical Specification Group Services and System Aspects; Study on Architecture for Next Generation System, (Release 14).
3GPP Technical Report (TR) 38.802 V2.0.0 (Oct. 2016), Technical Specification Group Radio Access Network; Study on New Radio (NR) Access Technology Physical Layer Aspects, (Release 14).
JP Office Action for JP Application No. 2021-049482, dated Sep. 13, 2022 with English Translation.
LG Electronics, "Further discussion on common signaling", 3GPP TSG RAN WG1 #88, R1-1702474, Feb. 13-17, 2017.
CN Office Communication for CN Application No. 202210311827. 9, dated Dec. 5, 2023 with English Translation.

\* cited by examiner

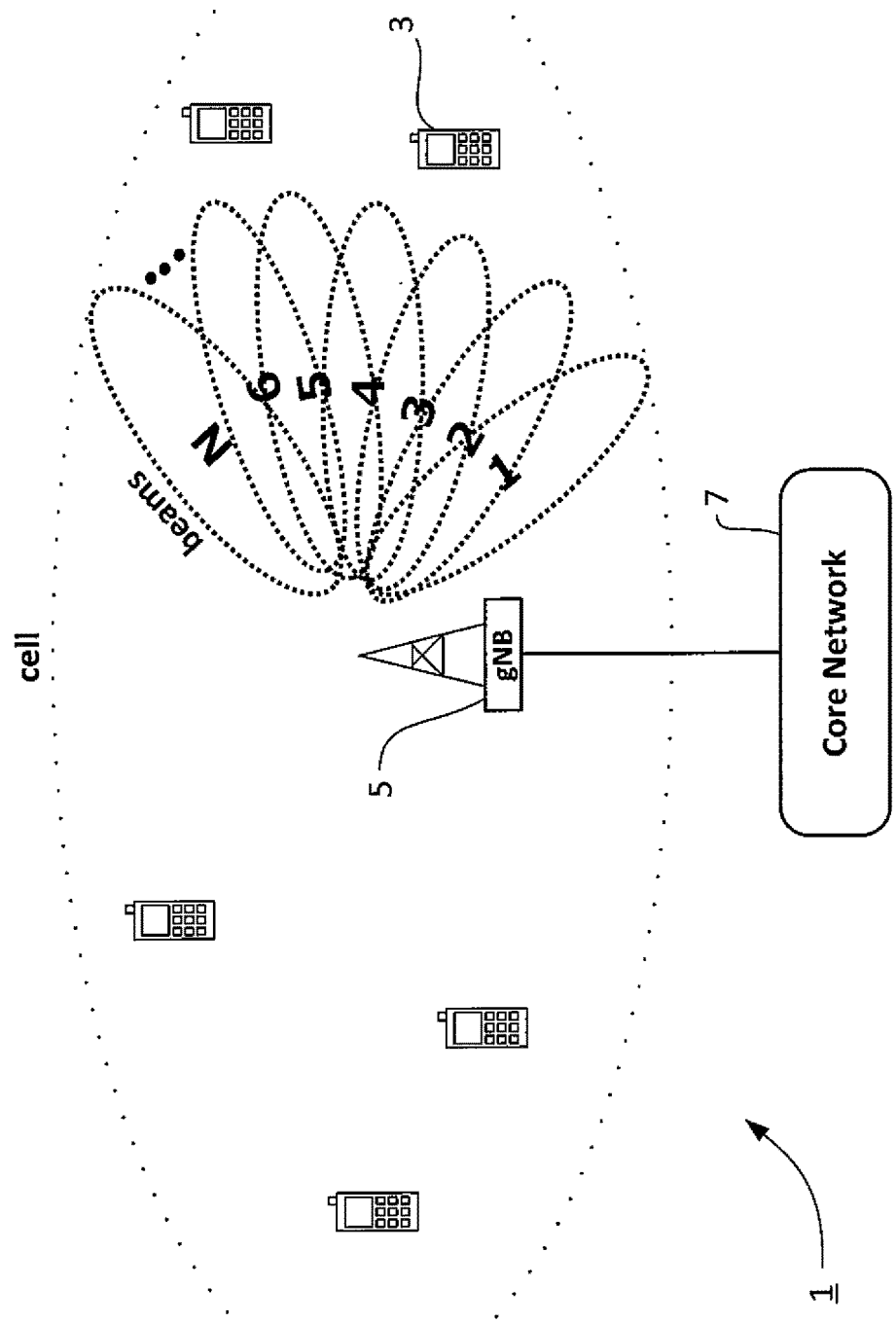
[Fig. 1]

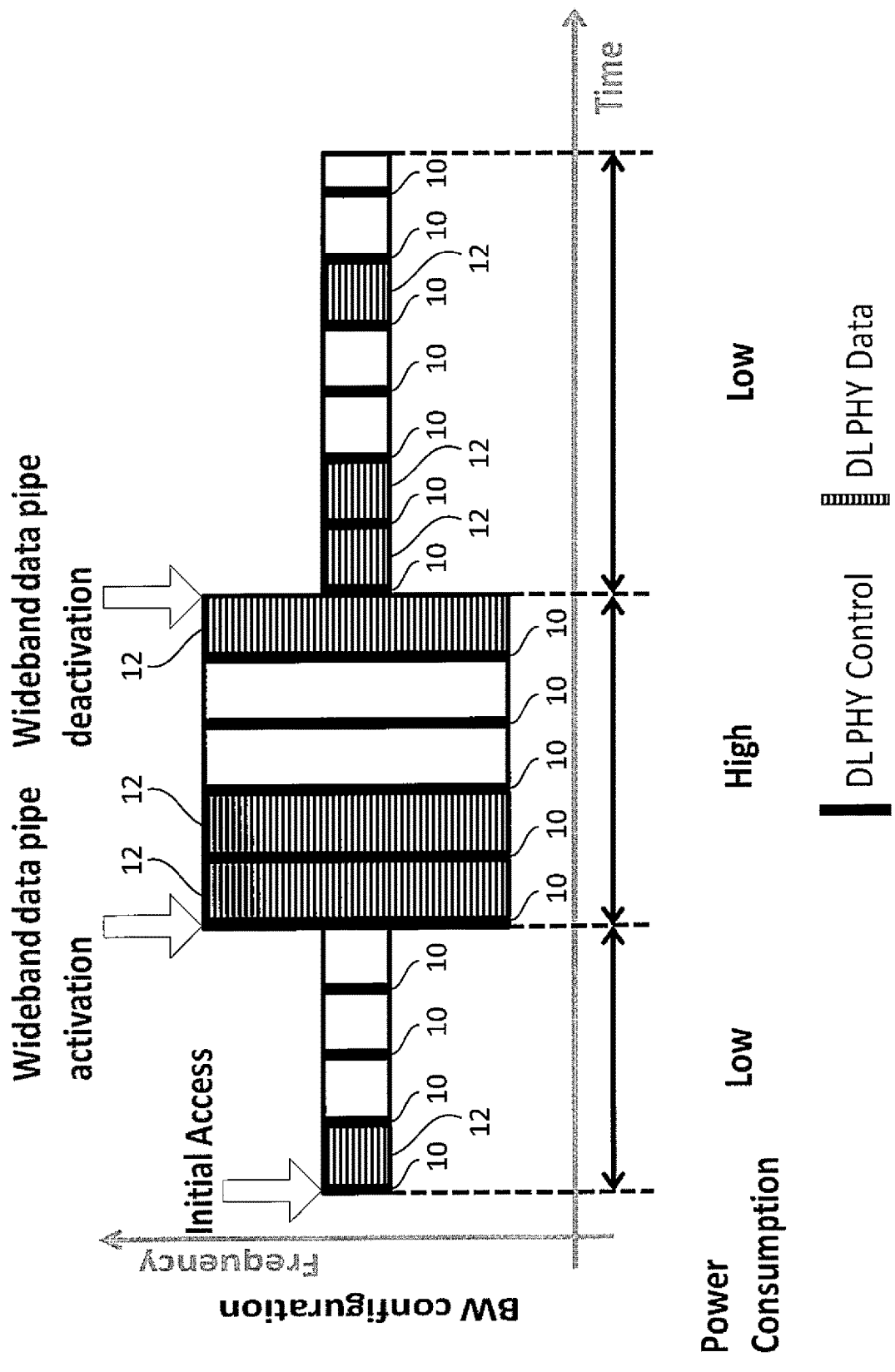
[Fig. 2]

[Fig. 3]
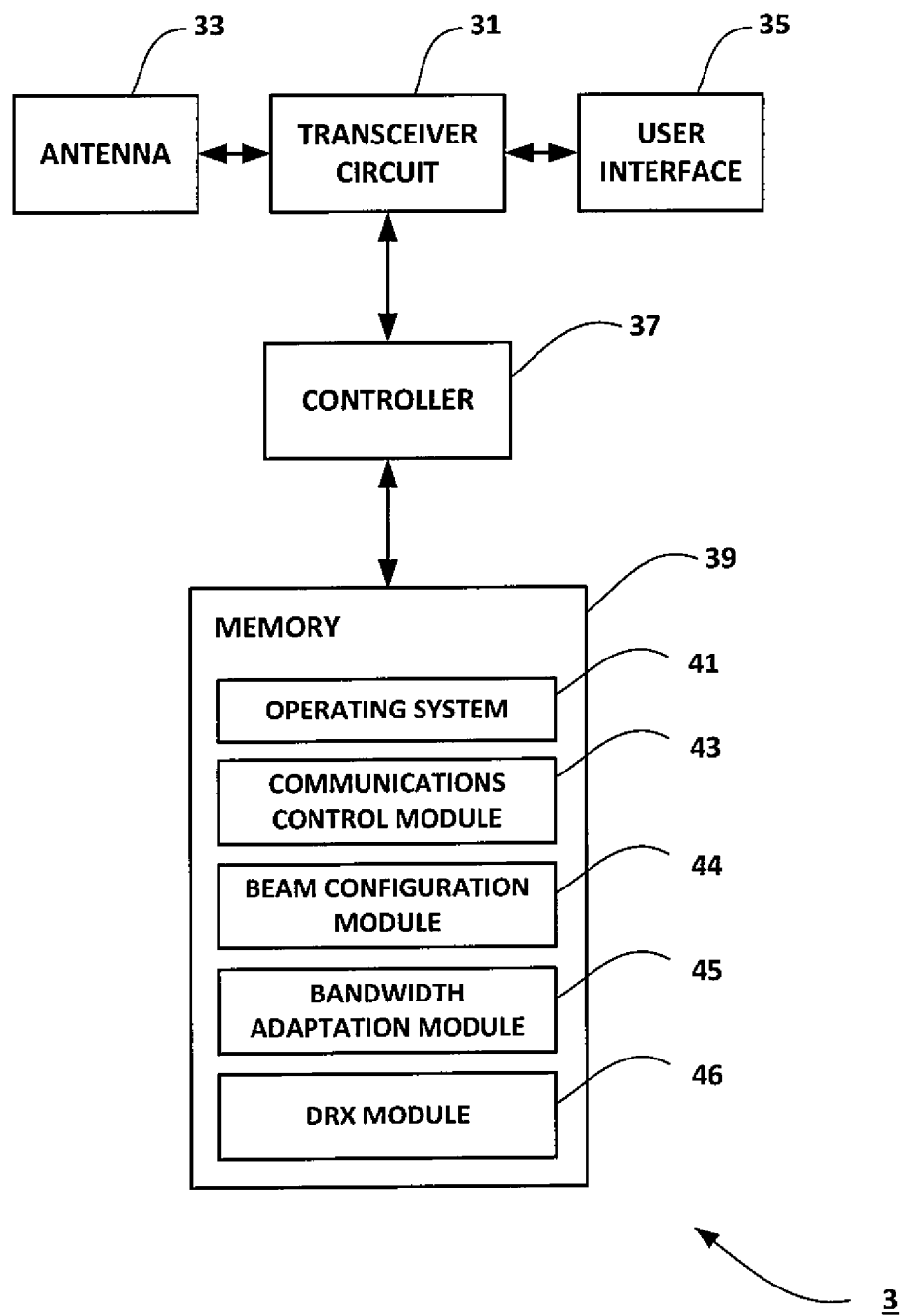

[Fig. 4]
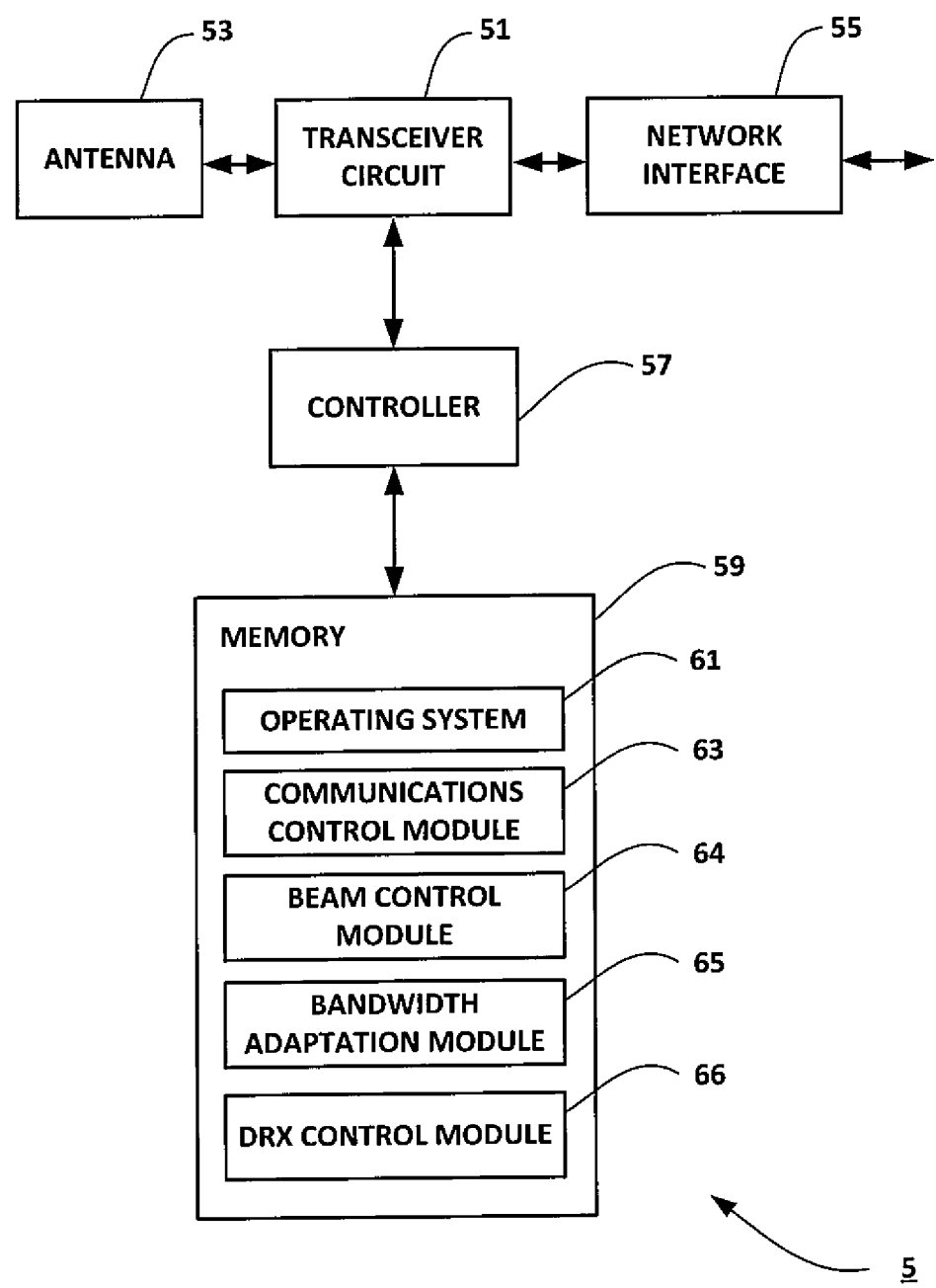

[Fig. 5]
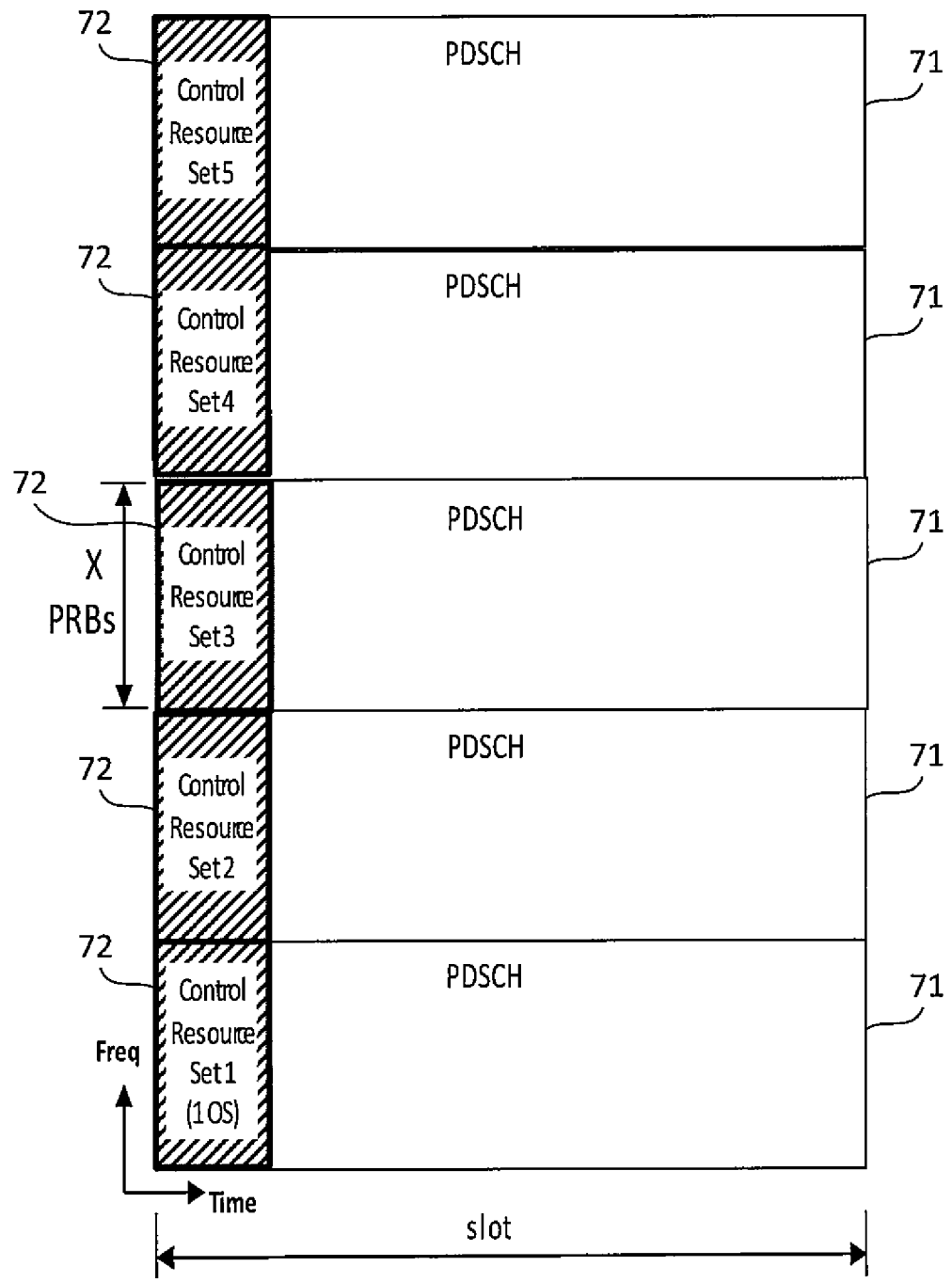

[Fig. 6]
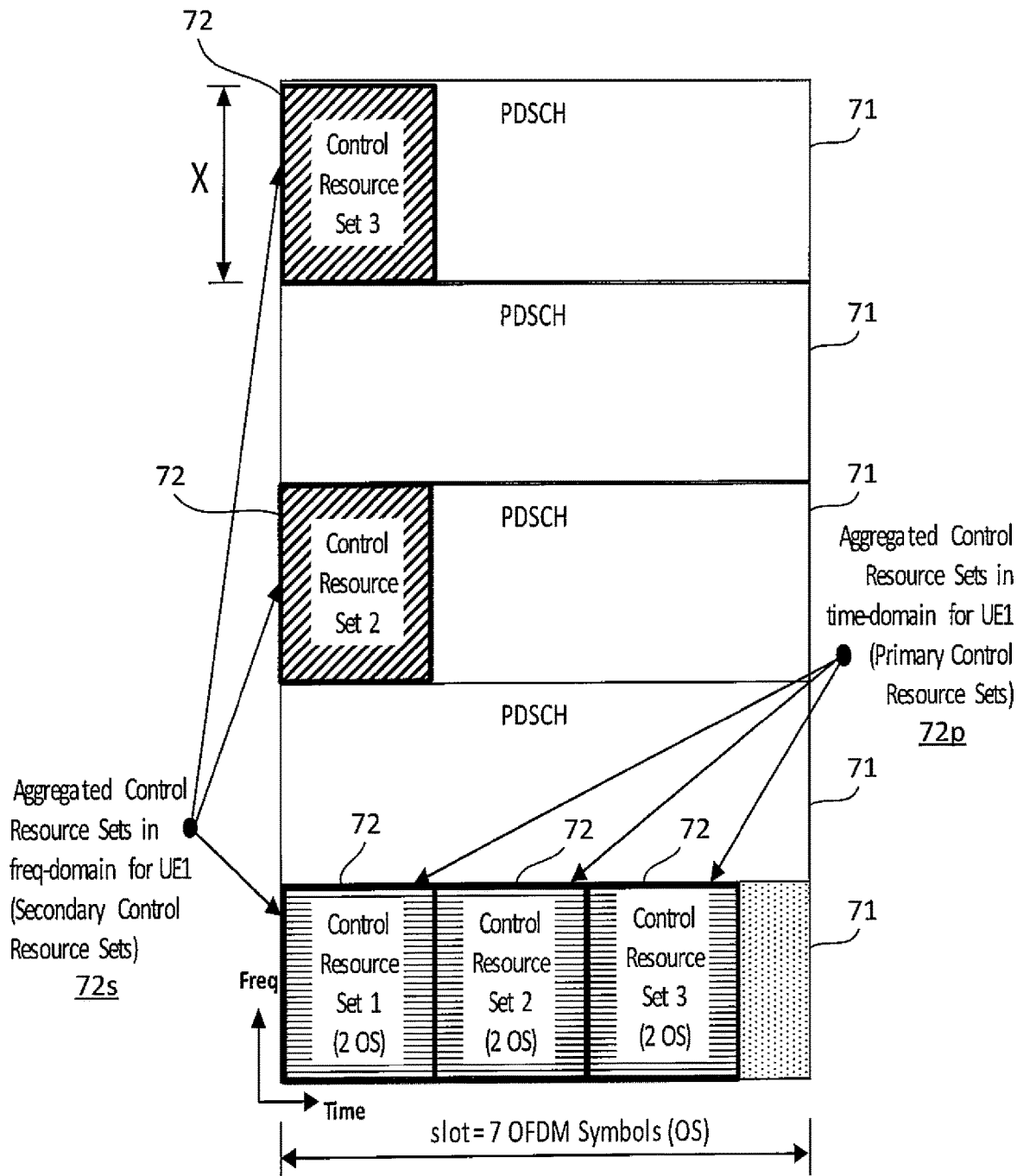

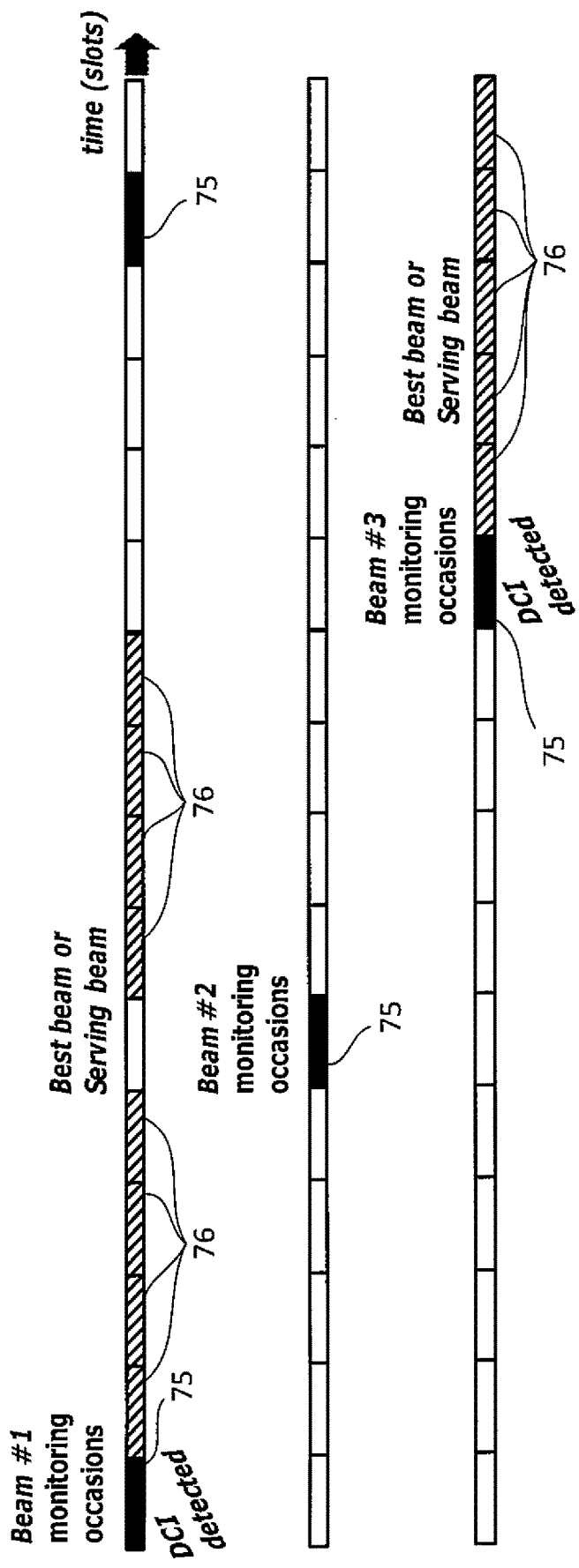

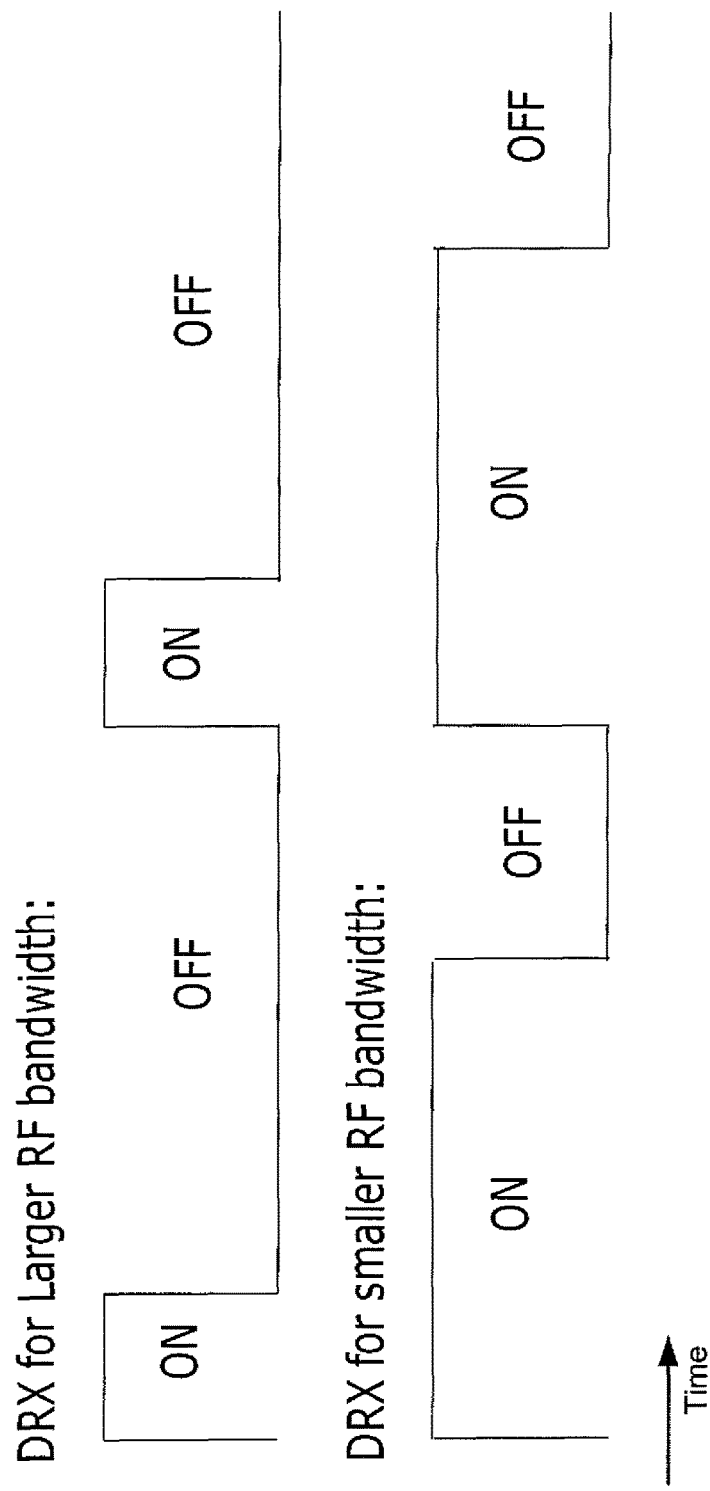
[Fig. 8]

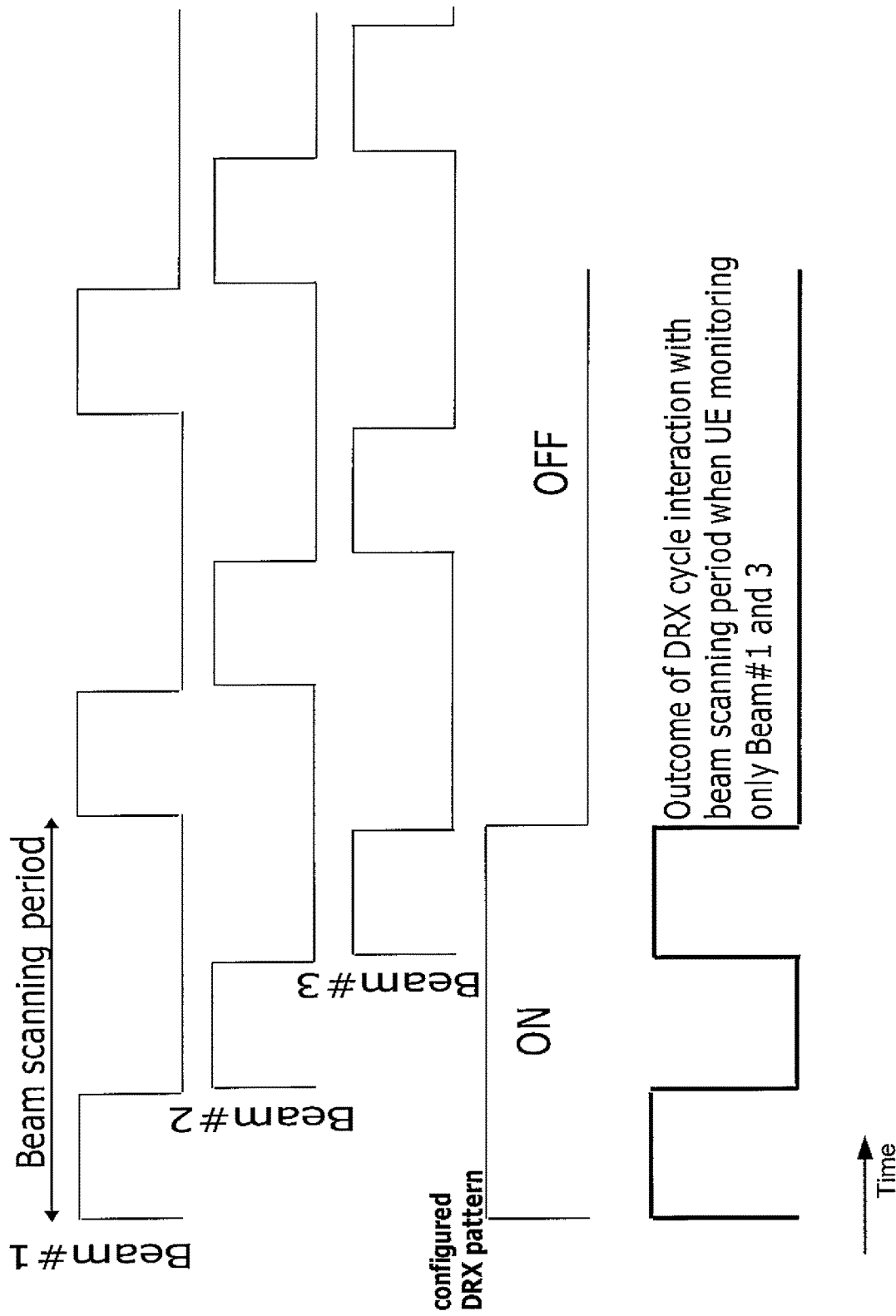
[Fig. 9]

APPARATUS AND METHODS FOR COMMUNICATING CONTROL RESOURCE SET DATA

CROSS-REFERENCE TO RELATED PATENT APPLICATIONS

This application is a continuation of U.S. patent application Ser. No. 16/495,445, filed Sep. 19, 2019, which is a National Stage Entry of International Application No. PCT/JP2018/011290, filed Mar. 22, 2018, which claims priority from British Patent Application No. GB1704762.2, filed Mar. 24, 2017, the contents of all of which are incorporated herein by reference, in their entirety.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to bandwidth adaptation in the so-called 'Next Generation' systems.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services. Various details of 5G networks are described in, for example, the 'NGMN 5G White Paper' V1.0 by the Next Generation Mobile Networks (NGMN). 3GPP intends to support 5G by way of the so-called 3GPP Next Generation (NextGen) radio access network (RAN) and the 3GPP NextGen core network.

Under the 3GPP standards, a NodeB (or an 'eNB' in LTE, 'gNB' in 5G) is the base station via which communication devices (user equipment or 'UE') connect to a core network and communicate to other communication devices or remote servers. For simplicity, the present application will use the term base station to refer to any such base stations and use the term mobile device or UE to refer to any such communication device. The core network (e.g. the EPC in case of LTE) hosts functionality for subscriber management, mobility management, charging, security, and call/session management (amongst others), and provides connection for communication devices to external networks, such as the Internet.

Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user, although it is also possible to connect so-called 'Internet of Things' (IoT) devices and similar machine-type communication (MTC) devices to the network. For simplicity, the present application refers to mobile devices (or UEs) in the description but it will be appreciated that the technology described can be implemented on any communication devices (mobile and/or generally stationary) that can connect to a communications network for sending/receiving data, regardless of whether such communication devices are controlled by human input or software instructions stored in memory.

In 3GPP networks, user data is transmitted between base stations and UEs over the so-called Physical Downlink Shared Channel (PDSCH)—although other channels may also be used (e.g. a broadcast channel). The so-called Physical Downlink Control Channel (PDCCH)—which is normally provided within the same frequency band as the PDSCH-carries Downlink Control Information (DCI) for UEs. The DCI specifies which UE is being scheduled for transmission (over the PDSCH) and over which specific communication resources.

3GPP technical report (TR) 23.799 V0.7.0 describes a possible architecture and general procedures for NextGen (5G) systems planned for Release 14 of the 3GPP standards. 3GPP also studied the potential use of frequency bands up to 100 GHz for new (5G) radio access networks, with a maximum channel bandwidth of 400 MHz per NR carrier in Rel-15. Directional beamforming and massive antenna technologies may also be used in order to overcome the severe channel attenuation characteristics associated with certain high frequency bands (e.g. mmWave bands). The term 'massive antenna' refers to an antenna having a high number of antenna elements (e.g. 100 or more) arranged in an array. Effectively, such a massive antenna may be used to communicate with several users at the same time, thus facilitating multi-user multiple-input and multiple-output (MU-MIMO) transmissions. A base station (also referred to as a transmission and reception point (TRP) in this case) may be configured to form respective beams for communicating with a plurality of UEs substantially concurrently and using associated directional beams.

3GPP intends to provide one or more TRPs per new radio (NR) base station (i.e. 5G base station, or gNB). The expected NR control structure has been presented in 3GPP Technical Report (TR) 38.802 V2.0.0, the contents of which are incorporated herein by reference. This technical report describes, amongst others, agreements regarding: a suitable mechanism to recover from beam failure; the possibility to apply radio frequency (RF) bandwidth adaptation; and motivation of bandwidth adaptation for NR.

In networks employing NR, up to hundreds or thousands of MHz system bandwidth may need to be supported on the air interface between base stations and user equipment. The motivation for bandwidth adaptation in NR networks has been summarised in 3GPP Tdoc R1-1611041. This document discloses that in LTE, UEs consume over 60% of power for low-data-rate services and decoding the PDCCH (which carries Downlink Control Information (DCI) for UEs). UE power consumption is substantially proportional to the operating bandwidth (the larger the bandwidth being used, the larger the associated power consumption). Therefore, it appears to be more power efficient for UEs to adapt their operating bandwidth to match their incoming (downlink) traffic.

SUMMARY OF INVENTION

Technical Problem

3GPP agreed that NR-PDCCH transmissions will support robustness against beam pair link blocking and UEs can be configured to monitor NR-PDCCH on a number 'M' beam pair links simultaneously (where $M \geq 1$, [Math. 1]

and the maximum value of M may depend at least on UE capability). However, it is still being studied whether to allow UEs to choose at least one beam out of M beams for NR-PDCCH reception.

In NR, UEs can be configured to monitor NR-PDCCH on different beam pair link(s) in different NR-PDCCH Orthogonal Frequency Division Multiplexing (OFDM) symbols. However, it is still being studied whether UEs should monitor NR-PDCCH on one beam pair link with shorter duty cycle than on other beam pair link(s). The time granularity of configuration, e.g. slot level configuration, symbol level configuration is still not yet decided. The configuration may also apply to scenarios where a UE may not have multiple RF chains.

3GPP still needs to decide on the definition of monitoring NR-PDCCH on beam pair link(s). It has been agreed that parameters related to UE Rx (receiver) beam setting for monitoring NR-PDCCH on multiple beam pair links are to be configured by higher layer signaling or MAC CE and/or considered in the search space design, although the required parameters and the need to support both higher layer signaling and MAC CE are still under study.

Regarding bandwidth adaptation, the following agreement was reached at the 3GPP RAN1 #86bis meeting: at least for single carrier operation, NR should allow a UE to operate in a way where it receives at least downlink control information in a first RF bandwidth and where the UE is not expected to receive in a second RF bandwidth that is larger than the first RF bandwidth within less than 'X' microseconds (the value of X is to be decided later).

It is for further study whether the first RF bandwidth is to be located within the second RF bandwidth, whether the first RF bandwidth is to be at the centre of the second RF bandwidth, the maximal ratio of the first RF bandwidth over the second RF bandwidth, the detailed mechanism, and how to implement RF bandwidth adaptation for RRM measurement.

3GPP also defined various control sets (sets of communication resources for transmission of control data), although it is not yet specified how to support the larger bandwidth available in NR (e.g. compared to LTE) using such control resource sets. The inventors have also realised that, when multiple beams and appropriate bandwidth adaptation are used, it may also be necessary to address the need for complexity reduction at the UE (e.g. which may be monitoring multiple NR-PDCCHs).

Accordingly, preferred example embodiments of the present invention aim to provide methods and apparatus which address or at least partially deal with the above issues relating to bandwidth adaptation.

Although for efficiency of understanding for those of skill in the art, the invention will be described in detail in the context of a 3GPP system (5G networks), the principles of the invention can be applied to other systems.

Solution to Problem

In one aspect, the invention provides a method performed by a communication device in a communication system comprising a base station serving an associated communication area, the method comprising: communicating using a first bandwidth; monitoring for control data transmitted, by the base station, using a first control resource set conveyed in the first bandwidth; switching to using a second bandwidth for said communicating, wherein the second bandwidth is different to the first bandwidth; and monitoring for control data transmitted, by the base station, using a second control resource set that is conveyed in the second bandwidth.

The invention also provides a method performed by a communication device in a communication system comprising a base station serving an associated communication area formed by a plurality of directional beams, the method comprising: monitoring, in a first monitoring opportunity, for control data transmitted, by the base station, using a first beam; monitoring, in a second monitoring opportunity, for control data transmitted, by the base station, using a second beam; receiving control data transmitted using at least one of: the first beam in the first monitoring opportunity; and the second beam in the second monitoring opportunity; and identifying a serving beam based on reception of the control data.

The invention also provides a method performed by a communication device in a communication system comprising a base station serving an associated communication area formed by a plurality of directional beams, the method comprising: receiving first control data transmitted, by the base station, using a first beam; receiving second control data transmitted, by the base station, using a second beam; wherein said second control data is a duplication of said first control data.

The invention also provides a method performed by a communication device in a communication system comprising a base station serving an associated communication area, the method comprising: communicating using a first bandwidth in accordance with a first discontinuous reception, DRX, configuration; switching to using a second bandwidth for said communicating, wherein the second bandwidth is different to the first bandwidth; and communicating using the second bandwidth in accordance with a second DRX configuration; wherein the first DRX configuration represents a different DRX pattern to the second DRX configuration.

The invention also provides a method performed by a communication device in a communication system comprising a base station serving an associated communication area formed by a plurality of directional beams wherein each beam has an associated monitoring opportunity during which the base station may transmit control data, the method comprising: communicating in accordance with a discontinuous reception, DRX, pattern having an on period and an off period; and monitoring for control data transmitted, by the base station, using at least one beam in a monitoring opportunity associated with the at least one beam, based on the DRX pattern; wherein the communication device monitors for control data in the monitoring opportunity associated with the at least one beam during the on period of the DRX pattern but does not monitor for control data in the monitoring opportunity during the off period of the DRX pattern.

The invention also provides a method performed by a base station in a communication system in which the base station serves a communication area, the method comprising: communicating with a communication device using a first bandwidth; transmitting control data, to the communication device, using a first control resource set conveyed in the first bandwidth; switching to using a second bandwidth for said communicating, wherein the second bandwidth is different to the first bandwidth; and transmitting control data, to the communication device, using a second control resource set that is conveyed in the second bandwidth.

The invention also provides a method performed by a base station in a communication system in which the base station serves a communication area formed by a plurality of directional beams, the method comprising: monitoring, following transmission of control data using a first beam, for feedback from a communication device relating to the control data transmitted using the first beam; monitoring, following transmission of control data using a second beam, for feedback from a communication device relating to the control data transmitted using the second beam; receiving feedback from the communication device relating to at least one of: the control data transmitted using the first beam; and the control data transmitted using the second beam; and identifying a serving beam based on reception of the feedback.

The invention also provides a method performed by a base station in a communication system wherein the base station serves an associated communication area formed by a plurality of directional beams, the method comprising: transmitting first control data, to at least one communication device, using a first beam; and transmitting second control data, to the at least one communication device, using a second beam; wherein said second control data is a duplication of said first control data.

The invention also provides a method performed by a base station in a communication system in which the base station serves an associated communication area, the method comprising: communicating, with a communication device, using a first bandwidth in accordance with a first discontinuous reception, DRX, configuration; switching to using a second bandwidth for said communicating, wherein the second bandwidth is different to the first bandwidth; and communicating, with the communication device, using the second bandwidth in accordance with a second DRX configuration; wherein the first DRX configuration represents a different DRX pattern to the second DRX configuration.

The invention also provides a method performed by a base station in a communication system in which the base station serves an associated communication area formed by a plurality of directional beams wherein each beam has an associated monitoring opportunity during which the base station may transmit control data, the method comprising: communicating, with a communication device, in accordance with a discontinuous reception, DRX, pattern having an on period and an off period; and transmitting control data, to the communication device, using at least one beam in a transmission opportunity associated with the at least one beam, based on the DRX pattern, such that: control data is transmitted in the transmission opportunity associated with the at least one beam during the on period of the DRX pattern but not transmitted in the monitoring opportunity during the off period of the DRX pattern.

Aspects of the invention extend to corresponding systems, apparatus, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

Example embodiments of the invention will now be described, by way of example, with reference to the accompanying drawings in which:

BRIEF DESCRIPTION OF DRAWINGS

FIG. 1 illustrates schematically a cellular telecommunication system to which example embodiments of the invention may be applied;

FIG. 2 is an overview of an exemplary bandwidth adaptation scenario in the system shown in FIG. 1;

FIG. 3 is a block diagram of a mobile device forming part of the system shown in FIG. 1;

FIG. 4 is a block diagram of a base station forming part of the system shown in FIG. 1;

FIG. 5 illustrates schematically an exemplary way in which aggregated control resource sets may be provided in the system of FIG. 1;

FIG. 6 illustrates schematically an exemplary way in which aggregated control resource sets may be provided in the system of FIG. 1;

FIG. 7 illustrates schematically an exemplary way in which user equipment may monitor beams and select an appropriate beam in the system of FIG. 1;

FIG. 8 illustrates schematically an example embodiment in which discontinuous reception may be used for bandwidth adaptation; and FIG. 9 illustrates schematically an example embodiment in which discontinuous reception may be used for bandwidth adaptation.

DESCRIPTION OF EMBODIMENTS

Overview

FIG. 1 schematically illustrates a telecommunications network 1 (e.g. a 3GPP NR network) in which user equipment 3 (mobile telephones and/or other mobile devices) can communicate with each other via base stations 5 (denoted 'gNB') using an appropriate radio access technology (RAT). It will be appreciated that in 5G systems base stations are also referred to as transmit receive points (TRPs). As those skilled in the art will appreciate, whilst five mobile devices 3 and one base station 5 are shown in FIG. 1 for illustration purposes, the system, when implemented, will typically include other base stations and mobile devices.

Each base station 5 operates one or more associated cells either via a TRP located at the base station and/or one or more remotely located TRPs (not shown in FIG. 1). In this example, for simplicity, the base station 5 operates a single cell. The base station 5 is connected to a core network 7 (e.g. via an appropriate gateway and/or user-plane/control-plane function) and neighbouring base stations are also connected to each other (either directly or via an appropriate base station gateway). The core network 7 may include, amongst others, a control plane manager entity and a user plane manager entity, one or more gateways (GWs) for providing a connection between the base stations 5 and other networks (such as the Internet) and/or servers hosted outside the core network.

The mobile device 3 connects to an appropriate cell (depending on its location and possibly on other factors, e.g. signal conditions, subscription data, capability, and/or the like) by establishing a radio resource control (RRC) connection with the base station 5 operating that cell. The mobile device 3 and base stations 5 (and other transmission points in the network) communicate over an appropriate air interface which depends on the RAT used. The mobile devices 3 communicate with core network nodes using so-called nonaccess stratum (NAS) signalling, which is relayed between the mobile device 3 and the appropriate core network node by the base station 5/TRP serving the mobile device 3.

In this example, the base station 5 and the mobile devices 3 communicate with each other using a multi-antenna scheme. Specifically, the base station 5 operates an associated antenna array (e.g. a massive antenna) for providing a plurality of directional beams for communicating with the various mobile devices 3 in the base station's 5 cell. Each beam is arranged to span (transmit) in a different direction (in three dimension, including elevation angle). Each beam may have an associated identifier (e.g. an appropriated 'Beam ID') which is unique (at least within the cell).

In the network shown in FIG. 1 (and in NR networks in general), beam management can be seen as a set of appropriate (e.g. L1/L2) procedures for acquiring and maintaining a set of TRP(s) and/or UE beams that can be used for downlink (DL) and uplink (UL) transmission/reception for a particular mobile device 3. For example, beam management may beneficially include one or more of the following aspects:

beam determination: for TRP(s) or UE to select its own Tx/Rx beam(s);
beam measurement: for TRP(s) or UE to measure characteristics of received beamformed signals;
beam reporting: for UE to report information of beamformed signal(s) based on beam measurement; and
beam sweeping: operation of covering a spatial area, with beams transmitted and/or received during a time interval in a predetermined way.

The beam configuration used in the cell defines the number of beams and the associated beam patterns. In the example shown in FIG. 1, the total number of beams is 'N', i.e. beams #1 though #N are currently configured for the cell of the base station 5 ('N' being a positive integer, at least '1').

The base station 5 is beneficially configured to transmit in its cell (or in each cell if the base station operates multiple cells) one or more reference signals, for example, a set of beam-specific reference signals (BRS). The mobile devices 3 may be configured to use the associated reference signals for performing signal strength and channel estimate measurements for each beam (beam reporting). The measurements are used (by the base station and/or the mobile device 3) for configuring an appropriate set of (one or multiple) beams for the mobile device 3, which set may be referred to as the operational beam set (OBS) of the mobile device 3.

The OBS may be dynamically updated, e.g. depending on signal conditions, load in the cell, a throughput and/or quality of service (QoS) required by the mobile device 3. Beneficially, when the OBS comprises multiple beams, the likelihood of the mobile device 3 suffering a radio link failure (RLF)—i.e. a loss of connection with the base station 5—is greatly reduced because in most situations there is at least one directional beam that the mobile device 3 can use and/or new beams may be added to the OBS if needed (at least temporarily).

It will be appreciated that the bandwidth that a particular mobile device 3 is able to use in its communications with the base station 5 (and other nodes via the base station 5) depends on the number of beams included in its associated OBS. However, it will also be appreciated that the bandwidth allocated/available for the mobile device 3 within any beam will not necessarily remain constant (i.e. the bandwidth in any beam may depend on the throughput required for the services used by the mobile device 3 and may also be (e.g. temporarily) affected by changes in signal conditions).

In this system, beneficially, the base station 5 is configured to adapt the bandwidth allocated to the mobile device 3 in accordance with the currently applicable throughput requirements for the communications for the mobile device 3 (which generally depend on e.g. services/applications being used by the mobile device 3 and/or its user). Specifically, the base station 5 is configured to control the mobile device 3 to use a default (e.g. relatively low) bandwidth for its communications with the base station 5 unless the mobile device 3 (or a node in communication with the mobile device 3) requests a different (e.g. a relatively high) bandwidth for the mobile device 3. Such relatively high bandwidth may be referred to as a 'wideband data pipe' and may be activated at least temporarily (e.g. as long as the increased bandwidth is determined to be necessary and/or until expiry of an associated timer).

The base station 5 may be configured to provide such (UE specific) wideband data pipe in a number of ways, including, for example:

by changing the bandwidth per beam (in at least one beam used by the mobile device 3);
by changing the number of beams used by the mobile device 3 (add/remove beams to/from the OBS); and/or
by changing the DRX settings for the beams associated with the mobile device 3.

It will be appreciated that bandwidth adaptation may be applied for the mobile device 3 either temporarily (e.g. for a predetermined duration and/or until deactivation by the mobile device 3 or a network node) or as long as the mobile device 3 remains connected to the network 1.

FIG. 2 is an overview of an exemplary bandwidth adaptation scenario. As can be seen, bandwidth adaptation may be performed in dependence on the (changes in) data transmission needs of the mobile device 3. In this example, the mobile device 3 may be initially configured with a relatively small (e.g. a default) bandwidth (or 'data pipe'), e.g. when the mobile device 3 is turned on or when it first accesses the network or a particular beam/cell/base station. Alternatively, the mobile device 3 may be configured with an appropriate bandwidth requested by the mobile device 3 and/or a last used bandwidth.

The base station 5 is configured to transmit downlink control data 10 (DCI via PDCCH and/or the like) regularly, e.g. in each subframe. The downlink control data 10 includes information identifying which mobile device 3 is being scheduled in that (or in a subsequent) subframe/slot, and the scheduled downlink data 12 is transmitted in accordance with the information included in the downlink control data 10. As can be seen, the bandwidth for the mobile device 3 at its initial access is relatively narrow, therefore the downlink control data 10 is also transmitted using a narrow (the same) bandwidth. Beneficially, therefore, the mobile device's 3 power consumption associated with receiving and decoding downlink control data 10 and any associated downlink data 12 can be kept relatively low. Moreover, the base station 5 is beneficially able to allocate its remaining resources to other users which may result in a better overall system efficiency.

When the mobile device 3 requires a larger bandwidth (e.g. due to an application on the mobile device 3 initiating data communication with a remote node, such as video streaming and/or the like), the base station 5 is configured to adapt the associated bandwidth (data pipe) accordingly (at least temporarily). As can be seen, therefore, upon activation of the wideband data pipe, the bandwidth available for the downlink data 12 is increased (compared to its previous size) thereby allowing the mobile device 3 to communicate a larger amount of data in each scheduling round (e.g. subframe). It will be appreciated that the associated downlink control data 10 may also beneficially be transmitted over the increased bandwidth (although not necessarily over the entire wideband data pipe). Then, at the end of the mobile device's 3 transmissions requiring the wider bandwidth, the wideband data pipe associated with the mobile device 3 may be deactivated (or reconfigured to an appropriate lower bandwidth, which might be different to the initial bandwidth). The wideband data pipe may be deactivated either automatically (e.g. when all data has been transmitted/received and/or upon expiry of an associated 'activity' timer) or when instructed by the base station 5 (which may happen upon request by the mobile device 3). Beneficially, adaptation of the bandwidth allows the mobile device 3 (and the base station 5) to operate more efficiently whilst still allowing the mobile device 3 to use an appropriate wideband data pipe when needed (e.g. temporarily).

There are a number of ways in which bandwidth adaptation may be performed. For example, an appropriate (e.g. wider) bandwidth may be activated/deactivated using one or more of the following methods.

In order to activate a larger bandwidth (than the current one), the base station 5 may be configured to add appropriate signalling (e.g. 1-bit) to the DCI format in order to inform the mobile device 3 that it needs to open a wider bandwidth in the next possible slot (e.g. in the next subframe). The base station 5 may also apply cross-slot scheduling, in which case the base station 5 may be configured to schedule the mobile device 3 to use, in the next possible slot, a different bandwidth (e.g. larger than the current one). In other words, an indication to open a larger bandwidth may be sent by means of cross-slot scheduling. In order to deactivate a wider bandwidth, an activity timer may be used (thereby avoiding the need for additional signalling). In this case, the mobile device 3 may be configured to go back to a smaller bandwidth (or its previous bandwidth) upon expiry of the activity timer (when a predetermined amount of time has passed after the mobile device's last data transmission requiring the current/wider bandwidth). It will be appreciated that the base station 5 may also be configured to use an appropriate Medium Access Control (MAC) control element (CE) for indicating of a wider (or different) bandwidth to the mobile device 3.

Beneficially, in order to facilitate bandwidth adaptation, a number of predefined control resource sets (e.g. sets of resources semi-statically configured—e.g. using RRC signalling—for the transmission of control data) may be provided (e.g. to form an aggregated control resource set comprising an aggregation of a plurality of smaller control resource sets). In one example, at least a first ('primary') control resource set is provided (preferably having a narrow RF bandwidth), which comprises an appropriate aggregation of control resource sets in the time domain. Such primary control resource set may be used by the mobile 3 as a default or initial control resource set (or as a common search space) over which it expects to receive its control data and, optionally, associated user data (e.g. as long as the bandwidth meets the UE's requirements). However, a second ('secondary') (preferably wider) control resource set may also be provided, which typically comprises an appropriate aggregation of control resource sets in the frequency domain (i.e. a wideband data pipe). Thus, when activation of a wideband data pipe is required for the mobile device 3, data may also be transmitted via the resources corresponding to the secondary control resource sets as well (e.g. in addition to the primary control resource sets). It will be appreciated that the primary and secondary control resource sets may be provided via predetermined resources, known to both the mobile device 3 and the base station 5. The control resource sets may be specific to each UE, e.g. allocated based on information associated with the mobile device 3 and/or using a formula or function that results in different control resource sets for different UEs. Alternatively, the location of the primary and secondary control resource sets may be signalled to the mobile device 3 explicitly.

Advantageously, in order to further optimise the complexity and power consumption of mobile devices 3, the base station 5 may be configured to transmit control data via a limited number of beams rather than all beams allocated to a particular mobile device 3. For example, each mobile device 3 may be configured to monitor control channels via a number (e.g. two or three) of the best beams in a TDM manner. In another example, the mobile devices 3 may be configured to monitor all their associated beams for control channel transmissions but only one beam at a time. In order to do so, appropriate monitoring occasions may be configured for each beam. Therefore, even if one of the beams (e.g. the current serving beam) suffers from beam failure, the mobile device 3 is beneficially able to receive its control data via a different beam (and subsequently switch to that beam as its new serving beam) during an associated monitoring occasion. In yet another example, control channel transmissions for a particular mobile device 3 may be duplicated (transmitted simultaneously over two or more beams) effectively resulting in the control transmissions being superpositioned.

In a particularly beneficial example, the base station 5 and the mobile device 3 may be configured to apply a bandwidth adaptive DRX approach, in which the actual DRX setting being applied depends on the currently used bandwidth of the mobile device 3. For example, such 'bandwidth adaptive' DRX configuration may comprise a number of different DRX configurations (different DRX cycles and/or ON/OFF periods) for different bandwidths that can be used by the mobile device 3. It will be appreciated that the DRX cycle may further be combined with the above described beam specific monitoring occasions. In this case, the effective DRX 'ON' period may be derived as a combination of the applicable beam scanning periods and the configured DRX pattern. In other words, the mobile device 3 may be configured to monitor its allocated beams (during respective associated beam monitoring occasions per beam) only during 'ON' periods of its currently applicable DRX cycle.

As can be seen, therefore, appropriate bandwidth adaptation provides a number of benefits such as flexibility in serving the mobile devices via the base station's cell, improved power consumption (longer battery life), and more efficient usage of the base station's communication resources.

NR Overview

The following is a brief overview of NR (5G) networks and associated terms.

It will be appreciated that multiple numerologies (subcarrier spacing and scaling factors) may be supported in NR systems. In the context of NR technologies, a particular numerology is defined by its associated sub-carrier spacing and cyclic prefix (CP) overhead. Multiple subcarrier spacings can be derived by scaling a basic subcarrier spacing by an integer 'N'. The numerology used can be selected independently of the frequency band.

Physical resource block (PRB) is defined such that the number of subcarriers per PRB is the same for all numerologies (12 subcarriers per PRB).

Multiplexing different numerologies may be performed in time division multiplexing (TDM) and/or frequency division multiplexing (FDM) manner for both downlink and uplink From UE perspective, multiplexing of different numerologies may be performed within/across a set of (one or more) subframes.

For subcarrier spacing of $2^m \times 15$ kHz, subcarriers are mapped on the subset/superset of those for subcarrier spacing of 15 kHz in a nested manner in the frequency domain and the PRB grids are defined as the subset/superset of the PRB grid for subcarrier spacing of 15 kHz in a nested manner in the frequency domain.

From network perspective, multiplexing of transmissions with different latency and/or reliability requirements for enhanced Mobile Broadband (eMBB)/Ultra Reliable Low Latency Communications (URLLC) in downlink may be supported by using the same subcarrier spacing with the same CP overhead or using different subcarrier spacing. NR supports dynamic resource sharing between different latency and/or reliability requirements for eMBB/URLLC in downlink Dynamic resource sharing between URLLC and eMBB may be supported by transmitting URLLC scheduled traffic where URLLC transmission may occur in resources scheduled for ongoing eMBB traffic. DL dynamic resources sharing between eMBB and URLLC is enabled without pre-emption by scheduling the eMBB and URLLC services on non-overlapping time/frequency resources.

<Control Channel>

A number of control channels (e.g. NR-PDCCH) may be used for controlling communications between base stations and user equipment. It will be appreciated that, as in NR systems in general, at least the QPSK modulation scheme is supported for the modulation of the NR-PDCCH. For single stage downlink control information (DCI), the modulation scheme for NR-PDCCH is QPSK. In frequency-domain, the resource unit size (which may or may not include any demodulation reference signal (DM-RS)) for a particular control channel may be a single PRB or multiple PRBs. It will be appreciated that a NR-PDCCH candidate may consist of a set of NR-CCEs and a NR-CCE may consist of a fixed number of resource element groups (REGs). A REG may be one RB during one OFDM symbol (OS) which may or may not include DM-RS (at least for the case where the DL control region consists of one or more OS(s) of a slot or a 'mini-slot'). However, at least for eMBB, multiple NR-CCEs cannot be transmitted on the same REG in one OFDM symbol except for spatial multiplexing to different UEs (MU-MIMO).

The so-called control resource set is defined as a set of REGs under a given numerology. At least for single stage DCI design, each UE is configured to monitor for associated downlink control information in one or more control resource sets (which may be specific to a particular UE). The BW for control resource set is smaller than or equal to the carrier bandwidth (up to a certain limit). The control resource set is a set of REGs within which the UE attempts to blindly decode downlink control information. The REGs may or may not be frequency contiguous. When the control resource set spans multiple OFDM symbols, a control channel candidate may be mapped to multiple OFDM symbols or to a single OFDM symbol. The gNB may be configured to inform UEs which control channel candidates are mapped to each subset of OFDM symbols in the control resource set. This does not preclude that a UE may receive additional control information elsewhere within or outside the control resource set in the same or different OFDM symbol(s). It will be appreciated that each UE may have one or more control resource sets. NR networks are expected to support dynamic reuse of at least part of resources in the control resource sets for data (for the same or a different UE), at least in the frequency domain. From gNB perspective, DL control channel can be located at the first OFDM symbol(s) in a slot and/or mini-slot. UE-specific DL control information monitoring occasions at least in time domain can be configured. It will be appreciated that a minimum granularity of DCI monitoring occasion may be configured (e.g. per UE). For example, the minimum granularity of DCI monitoring occasion may be once per slot (e.g. for single-stage DCI design).

<Beam Management>

In NR networks, a UE can trigger an appropriate mechanism to recover from beam failure. The UE may be configured to trigger a mechanism to recover from beam failure when it has determined that beam failure has occurred. For example, the UE may determine that a beam failure event has occurred when the quality of beam pair link(s) of an associated control channel falls low enough (e.g. in comparison with a threshold and/or at time-out of an associated timer) and/or meets any other predetermined condition. Whilst the beam pair link is used herein as an example, it will be appreciated that other suitable measures may also be used. The network (gNB) configures the UEs with appropriate resources for UL transmission of signals for recovery purpose. Configurations of resources are supported where the base station is listening from all or partial directions, for example, a random access region and/or the like. The UL transmission/resources to report beam failure may be located in the same time instance as Physical Random Access Channel (PRACH) (e.g. resources orthogonal to PRACH resources) or at a time instance (which may be configurable per UE) different from PRACH. Transmission of DL signal is supported for allowing the UE to monitor the beams for identifying new potential beams.

NR supports beam management with and without beam-related indication. When beam-related indication is provided, information pertaining to UE-side beamforming/receiving procedure used for CSI-RS-based measurement may be indicated through Quasi-Co-Location (QCL) to UE. NR supports using the same or different beams on control channel and the corresponding data channel transmissions.

For NR-PDCCH transmission supporting robustness against beam pair link blocking, each UE may be configured to monitor NR-PDCCH on M beam pair links simultaneously, where $$M \geq 1, \qquad \text{[Math. 2]}$$

and the maximum value of M may depend at least on UE capability. UEs may be configured to monitor NR-PDCCH on different beam pair link(s) in different NR-PDCCH OFDM symbols. Parameters related to UE Rx beam setting for monitoring NR-PDCCH on multiple beam pair links may be configured by higher layer signalling or MAC CE and/or considered in the search space design.

Mobile Device

FIG. 3 is a block diagram illustrating the main components of the mobile device 3 shown in FIG. 1 (e.g. a mobile telephone or other user equipment). As shown, the mobile device 3 has a transceiver circuit 31 that is operable to transmit signals to and to receive signals from a base station 5 via one or more antenna 33. The mobile device 3 has a controller 37 to control the operation of the mobile device 3.

The controller 37 is associated with a memory 39 and is coupled to the transceiver circuit 31. Although not necessarily required for its operation, the mobile device 3 might of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile device 3 by, in this example, program instructions or software instructions stored within the memory 39. As shown, these software instructions include, among other things, an operating system 41, a communications control module 43, a beam configuration module 44, a bandwidth adaptation module 45, and a DRX module 46.

The communications control module 43 is operable to control the communication between the mobile device 3 and its serving base station(s) 5 (and other communication devices connected to the base station 5, such as further mobile devices and/or core network nodes).

The beam configuration module 44 is responsible for managing the beams used (allocated for use) by the mobile device 3 in the current serving cell (or cells), e.g. by maintaining an appropriate OBS (or respective OBS's) for the mobile device 3. This includes, for example, adding and removing cells (e.g. based on information provided by the base station 5 and/or the signal measurement module 46) to the set of cells allocated for the mobile device 3.

The bandwidth adaptation module 45 is responsible for controlling switching between appropriate bandwidths corresponding to the current needs (or configuration) of the mobile device 3. Specifically, the bandwidth adaptation module 45 controls activation/deactivation of an appropriate wideband data pipe. In some examples, this is achieved by switching between using an appropriate primary control resource set and using a secondary control resource set (e.g. in addition to the primary control resource set).

The DRX module 46 is responsible for controlling the transceiver 31 for discontinuous reception (and/or transmission) when configured by the base station 5. In some examples, such discontinuous reception/transmission may be employed per beam. In this case, bandwidth adaptation may be facilitated by changing the DRX pattern employed by the mobile device 3.

Although not shown in FIG. 3, it will be appreciated that the mobile device 3 may also include an appropriate measurement and reporting module for performing signal quality measurements and reporting (to the base station 5). Such signal quality measurements may be performed over (beam specific) reference signals transmitted by the base station 5 and based on an appropriate measurement configuration provided by the serving base station 5. The signal quality measurements may include, for example, (detailed) Channel Status Information (CSI) measurements, reference signal received power (RSRP), reference signal received quality (RSRQ), received signal-to-noise ratio (SNR), and/or signal to interference plus noise ratio (SINR) measurements and associated reporting.

Base Station

FIG. 4 is a block diagram illustrating the main components of a base station 5 shown in FIG. 1. As shown, the base station 5 has a transceiver circuit 51 for transmitting signals to and for receiving signals from the communication devices (such as mobile devices 3/user equipment) via one or more antenna 53 (e.g. an antenna array/massive antenna), and a network interface 55 for transmitting signals to and for receiving signals from network nodes (e.g. other base stations and/or nodes in the core network 7). The base station 5 has a controller 57 to control the operation of the base station 5. The controller 57 is associated with a memory 59. Software may be pre-installed in the memory 59 and/or may be downloaded via the communications network 1 or from a removable data storage device (RMD), for example. The controller 57 is configured to control the overall operation of the base station 5 by, in this example, program instructions or software instructions stored within the memory 59. As shown, these software instructions include, among other things, an operating system 61, a communications control module 63, a beam control module 64, a bandwidth adaptation module 65, and a DRX control module 66.

The communications control module 63 is operable to control the communication between the base station 5 and mobile devices 3 (user equipment) and other network entities that are connected to the base station 5. The communications control module 63 also controls the separate flows of downlink user traffic (via associated data radio bearers) and control data to be transmitted to communication devices associated with this base station 5 including, for example, control data for core network services and/or mobility of the mobile device 3 (also including general (non-UE specific) system information and reference signals).

The beam control module 64 is responsible for managing the beams used (allocated for use) by each mobile device 3 in the cell (or cells) of the base station 5, e.g. by maintaining an appropriate OBS (or respective OBS's) for the mobile device 3. This includes, for example, adding and removing cells to the set of cells allocated for a particular mobile device 3 (e.g. based on information such as signal measurements provided by that mobile device 3, associated bandwidth requirements, services used, mobility of the mobile device 3, and/or other information relevant to the cell, such as load information).

The bandwidth adaptation module 65 is responsible for controlling switching between appropriate bandwidths corresponding to the current needs (or configuration) of mobile devices 3 served by the base station 5. Specifically, the bandwidth adaptation module 65 controls activation/deactivation of an appropriate wideband data pipe. In some examples, this is achieved by switching between using an appropriate (UE specific) primary control resource set and using a secondary control resource set (e.g. in addition to the primary control resource set).

The DRX control module 66 is responsible for configuring mobile devices 3 for discontinuous reception (and/or transmission) when appropriate. In some examples, such discontinuous reception/transmission may be employed per beam. In this case, bandwidth adaptation may be facilitated by changing the DRX pattern employed by the mobile device 3.

In the above description, the mobile device 3 and the base station 5 are described for ease of understanding as having a number of discrete modules (such as the communications control modules and the bandwidth adaptation modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Operation

A more detailed description will now be given (with reference to FIGS. 5 to 9) of some ways in which bandwidth adaptation may be performed for communications between user equipment and TRPs (base stations).

FIGS. 5 and 6 illustrate schematically some exemplary ways in which control resource sets may be provided in the system of FIG. 1. Specifically, FIG. 5 shows an example in which each PDSCH resource 71 has the same number (e.g. one) of associated control resource sets 72 (which may or may not be aggregated) and FIG. 6 shows various ways in which (UE specific) aggregated control resource sets 72 may be provided.

Such control resource sets 72 may be beneficially configured for a particular mobile device 3 in order to allow the mobile device 3 to adapt its bandwidth to its current needs (e.g. to increase the bandwidth, at least temporarily).

Each control resource set 72 is a set of PRBs ('X' PRBs in FIG. 5) in the frequency domain in which the mobile device 3 is configured to attempt to blindly decode its DCI (if present). In the time-domain, the number of OFDM symbols (OS) may be either fixed or variable (e.g. 1, 2, 3 for a given UE). Each set of PRBs includes a predefined number of control channel elements (CCEs).

For initial access, the control resource sets 72 are preferably configured in advance, for example, the mobile device 3 may obtain them from the master information block (MIB) or system information (broadcast by the base station 5) or derive them implicitly from initial access information. Effectively, such pre-configured control resource sets 72 represent a common search space (CSS) for a particular UE (or a group of UEs). After initial access, further control resource sets 72 may be configured e.g. using higher layer signalling (RRC configuration and/or the like) in a UE specific manner. Such additional control resource sets 72 may be referred to as a UE-specific search space (USS).

The control resource sets 72 may be configured as either localised or distributed transmission. In the localised case the control resource sets 72 are substantially contiguous and in the distributed case the control resource sets 72 are not contiguous (i.e. they are spaced apart). It is also possible that the control resource sets are overlapping in frequency domain.

In the example shown in FIG. 5, the control resource sets 72 (CSS and/or USS) are provided in the beginning of each DCI monitoring occasion (e.g. over the first one or two OFDM symbols of each slot), in each PDSCH portion 71. It will be appreciated that some or all control resource sets 72 may be configured as common control resource sets (i.e. CSS), for example control resource set #3 in FIG. 5. However, some or all control resource sets 72 may also be configured as UE specific control resource sets (i.e. USS), if appropriate.

In this example, the mobile device 3 may be configured (limited) to use: only a pre-determined set of control resource sets 72 (e.g. one control resource set) and the associated PDSCH portion(s) 71 by default; and a larger set (e.g. all control resource sets 72) and the associated (e.g. all) PDSCH portions 71 when its associated wideband data pipe is active. In other words, the base station 5 may employ appropriate bandwidth adaptation by changing the number of control resource sets 72 and/or PDSCH portions 71 allocated to the mobile device 3. Accordingly, the base station 5 may beneficially configure the mobile device 3 to communicate using only its default (e.g. relatively narrow) bandwidth most of the time, unless the mobile device 3 requires a relatively larger bandwidth, in which case the base station 5 can allocate, at least temporarily, additional control resource sets 72 (and additional associated PDSCH portions 71) for the mobile device 3.

It will be appreciated that the smaller or default set(s) of control resource sets 72 may be referred to as primary control resource sets 72p and the additional set(s) of control resource sets 72 may be referred to as secondary control resource sets 72s (for a given mobile device 3).

In the example shown in FIG. 6, similarly to FIG. 5, the mobile device 3 is initially configured to monitor a relatively smaller RF bandwidth (which may be applicable to the common search space and/or its UE specific search space). In this example, bandwidth adaptation is realised by changing the number and/or the aggregation of control resource sets 72 (and/or associated PDSCH portions 71) employed for the mobile device 3.

The mobile device 3 may be configured with aggregated (contiguous) control resource sets 72 in the time-domain (e.g. in a slot) in a relatively small RF bandwidth (herein referred to as its primary control resource sets 72p). Specifically, in the example shown in FIG. 6, three control resource sets 72 (control resource sets #1 to #3, each comprising two OFDM symbols) are assigned to the primary control resource sets 72p of the mobile device 3 ('UE1'). It will be appreciated that the primary control resource sets 72p may carry DCI for that mobile device 3 and/or any associated user data (although user data may also be scheduled for a different PDSCH region 71 and/or a different slot, i.e. outside the control resource sets 72 of the mobile device 3).

In this system, so-called secondary control resource sets 72s may also be provided to compatible user equipment. Such secondary control resource sets 72s comprise further aggregated control resource sets 72 within the frequency domain (although some of the secondary control resource sets 72s may also be provided in the time domain, if appropriate). It will be appreciated that the secondary control resource sets 72s may be substantially contiguous although in the example shown in FIG. 6 they are non-contiguous. It is also possible that control resource sets are overlapping in frequency domain.

When the mobile device 3 requires only a smaller RF bandwidth, it monitors its primary control resource sets 71 p, and when it requires a larger RF bandwidth, the mobile device 3 also monitors its secondary control resource sets 72s.

Effectively, the mobile device 3 and the base station 5 are configured to employ a two-dimensional control structure, in which the mobile device 3 is configured to monitor control resource sets 72 in the frequency domain when operating in large RF bandwidth (when its wideband data pipe is active) and monitor control resource sets 72 in the time domain when operating in small RF bandwidth.

The bandwidth (denoted by 'X' in FIG. 6) of the smaller RF or primary control resource sets 72p may be beneficially defined in terms of number of PRBs (for example 4, 6, 8, or 24 RBs) or it may be defined in terms of MHz (for example 1.4 MHz, 5 MHz, 10 MHz, etc.). It will also be appreciated that the smaller RF bandwidth may be the same size as the bandwidth of the synchronisation signals (PSS and SSS) transmitted in the cell of the base station 5. The primary and secondary control resource sets 72p, 72s may be same or different for different UEs, e.g. in order to avoid blocking and/or to spread the control load in the frequency domain.

Operation—Determining a Default Control Resource Set

It will be appreciated that, in practice, there may be many control resource sets 72 in a given system bandwidth, but, each mobile device 3 is assigned with its own respective primary control resource sets 72p to monitor whilst operating in the small (default) RF bandwidth mode.

The following is a description of some exemplary ways in which a mobile device 3 can determine its (at least one) control resource set(s) 72 included in the default control resource set 72 for that mobile device 3.

Specifically, in a first example, the mobile device 3 is configured to determine at least one (e.g. the first) control resource set ('Set 1') in the frequency domain associated with that mobile device 3, based on information identifying the mobile device 3 (e.g. an appropriate UE identifier (UEID)). For example, if there are N control resource sets in the system bandwidth, then the formula "UEID mod N" may be used (wherein 'UEID' stands for an appropriate UE identifier associated with the mobile device 3 for which the control resource set 72 is applicable).

In a second example, the mobile device 3 is configured to determine at least one (e.g. the first) control resource set ('Set 1') associated with that mobile device 3, based on information explicitly signalled by the network. In this case, the base station 5 may be configured to transmit, to each UE (or a group of UEs) in connected state, respective information identifying which control resource set 72 is to be used as a starting set for the primary control resource sets 72p for that UE/UE group.

In a third example, the at least one (first) control resource set may be derived by the mobile device 3 implicitly, e.g. from initial access information, for example, from an appropriate (e.g. one to one) mapping between each PRACH resource and the corresponding starting set 72 of the UE's primary control resource sets 72p.

In a fourth example, the at least one (first) control resource set 72 may be selected randomly (e.g. using a pseudo-random or hashing function). In this case, the selection of the starting control resource set 72 is of equal probability between all control resource sets 72. This solution avoids the scenario of UEs selecting the same primary control resource sets 72 p and therefore minimises collisions between transmissions for different UEs.

For example, the mobile device 3 and the base station 5 may be configured to use the following hashing function for deriving a starting control resource set 72 in a given slot:

$$Y_k = ((A * Y_{k-1}) \bmod D) \bmod N$$

where Y−1=RNTI (Radio Network Temporary Identifier); A=39827; D=65537; N=the total number of control resource sets 72 in the system bandwidth (in a given cell), and k is a slot index (for example 0 . . . 19).

In each above example, the remaining control resource sets 72 (for a given UE) may be fixed in the time domain (e.g. have a predetermined location relative to the first control resource set) or they may be configurable (i.e. variable) by the base station 5.

The secondary control resource sets 72s may also be implicitly derived from the primary control resource sets 72p (e.g. from the first set thereof), for example by applying a fixed offset relative to the primary control resource sets 72p or by applying odd or even resource sets 72 in the frequency domain. It will also be appreciated that the appropriate secondary control resource sets 72s may be explicitly signalled from higher layers.

Operation—Complexity and Power Consumption Associated with Bandwidth Adaptation

As explained above, NR networks employ a beam-oriented transmission technique where the mobile device 3 is configured to monitor a NR-PDCCH on its serving beam for DCI transmissions. However, beam blocking may happen quite often (especially in the higher frequency bands employed in NR networks), therefore, NR compatible mobile devices 3 are capable of monitoring multiple beams for receiving NR-PDCCH.

Accordingly, each mobile device 3 may be configured to monitor multiple NR-PDCCHs (e.g. from N beams) even when it is using a relatively small RF bandwidth (e.g. its associated primary control resource sets 72 p).

However, if the mobile device 3 monitors multiple NR-PDCCHs on multiple beams, the processing complexity will increase (proportionally with the number of beams) for receiving and decoding the multiple NR-PDCCHs. In other words, even when the wideband data pipe is deactivated, the mobile device 3 may be required to perform processing intensive monitoring of multiple beams and associated decoding (in order to determine whether a DCI is transmitted for that mobile device 3).

It is assumed by the inventors that the mobile device 3 may be configured to report appropriate feedback (to its serving base station 5) about the best N beams (N depending on configuration), including their associated CSI values (and/or the like). The base station 5 receiving the feedback can thus assume that at least one beam is working, but it does not know which one (due to potential beam blocking of one or more of the reported beams).

If the mobile device 3 is unable to successfully decode the control channels from all beams, then it is configured to declare a radio link failure (RLF) and initiate appropriate PRACH transmission procedures in order to re-establish its connection with the base station 5.

Beneficially, in this system the mobile device 3 is configured to monitor a small number of beams in a TDM manner (for example, the two or three strongest beams or the best N beams which may be configured per UE, e.g. N=3 for UE1/N=2 for UE2). The mobile device 3 may be configured to monitor these beams substantially continuously (but without monitoring all beams associated with that mobile device 3). It will be appreciated that even in case of beam sweeping, beams are usually transmitted in a TDM manner, thus, it is still possible for the mobile device 3 to monitor the small number of beams as described above. Beneficially, since the mobile device 3 is not required to monitor a large number (e.g. all) beams, it is possible to reduce its associated complexity and power consumption.

It will be appreciated that the serving base station 5 can determine which beam has failed when it detects DTX feedback from the PDSCH 71 scheduled on that beam. In this case, the mobile device 3 and the base station 5 may replace the failed beam with the next suitable beam, when appropriate.

<Monitoring Beams Periodically>

FIG. 7 illustrates schematically another exemplary way in which a mobile device 3 may monitor its associated beams.

In this example, rather than monitoring a limited (small) number of beams substantially continuously, the mobile device 3 is configured to monitor each associated beam periodically, during respective beam monitoring occasions 75 (which are preferably different for each beam). For example, the mobile device 3 may be configured to monitor each beam in a round-robin manner and/or the like. The monitoring occasions 75 for each beam should preferably be predefined (e.g. configured by the serving base station 5) in order for the base station 5 and the mobile device 3 to be aligned and avoid the mobile device 3 missing its DCI transmission.

In principle, the best beam for a particular mobile device 3 is the serving beam 76 that is used for scheduling data transmissions (control and user data) for that mobile device 3. In addition to the serving beam 76, the mobile device 3 may also be required to monitor other beams for potential beam switching (e.g. due to failure of the serving beam 76).

In this example, the base station 5 is configured to assume a possible beam failure with respect to a particular beam (serving beam 76) when the base station 5 does not receive any (explicit) Ack/Nack feedback (i.e. DTX) from the mobile device 3 following a PDSCH transmission on that beam. When the base station 5 determines that there is a potential beam failure, it is configured to switch to another suitable beam and start sending the control channel on that beam. Since the mobile device 3 is configured to monitor each beam periodically, during respective beam monitoring occasions 75, it is likely to be able to receive the PDSCH (re)transmission on one of the other beams and confirm receipt of the transmission by generating and sending appropriate feedback. The mobile device 3, upon receiving the control channel in a new beam, is configured to switch to that beam as its new serving beam 76.

In the scenario illustrated in FIG. 7, the mobile device 3 is initially monitoring beam #1 (its current serving beam 76) and also beams #2 and #3 in associated monitoring occasions 75. When the mobile device 3 detects a control channel transmission (e.g. DCI) on its current serving beam 76, it is configured to look for downlink transmissions via the serving beam 76 (and/or any other beam specified via the DCI). However, when the mobile device 3 detects a control channel transmission (e.g. DCI) on a different beam (in this example, beam #3), it is configured to switch to that beam as its new serving beam 76 (as long as it remains a suitable beam for that mobile device 3 and/or until it is configured otherwise).

<Duplicating PDCCH Transmission>

In yet another example, the base station 5 may be configured to duplicate its NR-PDCCH transmissions in each beam (N beams) so that the mobile device 3 is able to see a super-positioned version of the NR-PDCCH (similarly to single frequency network (SFN) transmissions).

In order to achieve SFN type transmission, all involved beams need to be coordinated, and the transmission should preferably have the same initialisations. The SFN transmission can be applied to all slots or can be applied to a subset of slots where during respective beam monitoring occasions 75 the mobile device 3 and the base station 5 are both aware and aligned. Beneficially, this alternative may be used even when CSI feedback is not available.

Operation—DRX

FIGS. 8 and 9 illustrate schematically some example embodiments in which discontinuous reception/transmission may be used for bandwidth adaptation.

FIG. 8 illustrates an exemplary DRX approach, similar to DRX in LTE, albeit slightly tailored to bandwidth adaptation purposes. Effectively, in this case, the base station 5 configures the mobile device 3 with bandwidth adaptation dependent DRX settings or 'bandwidth adaptive' DRX configuration, which may comprise different DRX configurations (different DRX cycles and/or ON/OFF periods) for different bandwidths used by the mobile device 3.

As can be seen, when the mobile device 3 operates in its smaller RF bandwidth region, for example at initial access, it applies a first DRX setting in which an associated DRX 'OFF' time period is applied for a relatively short period (during which the mobile device 3 is configured to turn off its transceiver 31) followed by a relatively longer 'ON' time period (during which the mobile device 3 is configured to turn on its transceiver 31). Accordingly, the mobile device 3 can be configured to monitor its associated beams only during the DRX ON window (in the given DRX cycle) which may result in further reduction in the mobile device's overall power consumption.

However, when operating in its larger RF bandwidth (with its wideband data pipe being activated), the mobile device 3 is configured to employ a different DRX setting. Specifically, in this example, a bandwidth adaptation specific DRX cycle may be provided such that an associated DRX 'OFF' time period is applied for a relatively long period and a DRX 'ON' time period is applied for a relatively short period (compared to the OFF time period and/or the ON time period of the DRX cycle applied during small RF operation). Accordingly, even when operating over a relatively large bandwidth, the mobile device 3 may be able to keep its power consumption at an optimal level due to applying a relatively short DRX ON window (in the given DRX cycle).

In other words, the DRX setting applied by the mobile device 3 is dependent on the current RF bandwidth allocation (wideband data pipe being activated or deactivated) for the mobile device 3. Beneficially, therefore, when the base station 5 configured an appropriate DRX setting for the mobile device 3, it takes into account any frequency domain information/RF bandwidth that the mobile device 3 may use. Thus, a first DRX setting may be provided for a default/initial/narrowband RF operation and a second (different) DRX setting may be provided to the mobile device 3 (either in advance or upon activation of the wideband data pipe) for wideband RF operation.

Although in FIG. 8 the first and second DRX cycles have the same duration, it will be appreciated that in some cases they may have different durations, if appropriate. It will also be appreciated that more than two DRX settings may be provided, for example, different DRX settings for different (ranges of) bandwidths, each DRX setting being tailored to allow optimal power consumption at the mobile device 3 for a specific bandwidth being used (e.g. falling within a range of bandwidths associated with that DRX setting). Since the base station 5 also knows which bandwidth is currently allocated for the mobile device 3 at any given time, the base station 5 is able to apply the correct DRX setting for the mobile device 3 (and time its transmissions for that mobile device 3 to coincide with its associated 'ON' period based on the currently applicable DRX setting).

FIG. 9 illustrates a modification of the example shown in FIG. 8. In this example, the mobile device 3 is configured to monitor multiple beams, one by one, based on an associated beam scanning period having a time window during which the mobile device 3 is configured to monitor a particular beam (and during which the mobile device may be configured not to monitor other beams). As can be seen in the top three patterns of FIG. 9, each beam can have a different beam monitoring window within its associated beam scanning period (which are repeated). Effectively, this corresponds to the embodiment described with reference to FIG. 7 above, in which different beams have different associated beam monitoring occasions 75.

However, in this example, the mobile device 3 is also configured to employ an appropriate DRX configuration (e.g. a bandwidth adaptive DRX configuration as described above with reference to FIG. 8). Beneficially, in this example the actual or effective DRX 'ON' period may be derived as a combination of the beam scanning period and the configured DRX pattern. Specifically, the mobile device 3 may be configured to monitor its allocated beams, during respective associated beam monitoring occasions 75 (or windows), only during 'ON' periods of its currently applicable DRX cycle. Thus, in the example shown in FIG. 9, if the mobile device 3 is monitoring beams #1 and #3 only, then the resulting beam monitoring activity after applying the DRX cycle is illustrated by the bottom pattern.

A further benefit associated with this modification is that the mobile device 3 may be able to achieve further reduction in its overall power consumption whilst still being able to adapt its bandwidth and use an appropriate wideband data pipe when necessary.

Modifications and Alternatives Detailed example embodiments have been described above. As those skilled in the art will appreciate, a number of modifications and alternatives can be made to the above embodiments whilst still benefiting from the inventions embodied therein. By way of illustration only a number of these alternatives and modifications will now be described.

It will be appreciated that the beam configuration may be different for different cells, depending on the coverage/throughput requirements for a particular cell. For example, a high number of very narrow beams may be used for a large cell radius, whilst fewer and relatively wider beams may be used to facilitate fast cell acquisition and reduce the overhead for transmission of beam-specific reference signals. In some cases, the beam configuration may consist of a single beam, defining the coverage of the whole cell (similarly to legacy cells).

It will also be appreciated that the beam configuration of a given cell may change semi-statically, e.g. for the purposes of self-organising network (SON) adaptation such as Capacity and Coverage Optimisation (CCOpt) and/or the like. In this case, reconfiguration of a particular beam configuration may include changing the beam-width of one or more beams and/or changing the number of beams (e.g. switching beams on or off).

In the above example embodiments, bandwidth adaptation is performed in dependence on the (changes in) data transmission needs of the mobile device. However, it will be appreciated that bandwidth adaptation may be performed in dependence on a number of other factors as well, including but not limited to: system load; signal quality; modulation scheme, application/service being used (user activated and/or background applications/services); user subscription; UE capability, UE power preference; UE battery saving preference/battery level; UE mobility (stationary/mobile/pedestrian/high speed); user location (home/office/public area/commuting); network/base station/cell being used; roaming/non-roaming users; time of day; and/or the like.

It will be appreciated that the specific bandwidth adaptation method employed and/or the way control resource sets are provided may differ from cell to cell, from base station to base station, from UE to UE. It will also be appreciated that bandwidth adaptation may be provided selectively, for example, for a subset of the UEs being served by the base station and/or a subset of beams employed by the base station.

In the above example embodiments the base station is described to transmit a plurality of directional beams. It will be appreciated that data may be transmitted substantially concurrently via the plurality of beams. However, in some cases, for example when a hybrid (part analogue and part digital) beamforming is used, it may not be possible to transmit all beams at once. It will be appreciated that in this case a technique referred to as 'beam sweeping' (i.e. transmitting one beam at a time) may be used.

In the above example embodiments, the base station uses a 3GPP radio communications (radio access) technology to communicate with the mobile device. However, any other radio communications technology (i.e. WLAN, WI-FI®, WIMAX®, BLUETOOTH®, etc.) can be used between the base station and the mobile device in accordance with the above embodiments. The above example embodiments are also applicable to 'non-mobile' or generally stationary user equipment.

In the above description, the mobile device and the base station are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above example embodiments, a number of software modules were described. As those skilled in the art will appreciate, the software modules may be provided in compiled or un-compiled form and may be supplied to the base station or to the mobile device as a signal over a computer network, or on a recording medium. Further, the functionality performed by part or all of this software may be performed using one or more dedicated hardware circuits. However, the use of software modules is preferred as it facilitates the updating of the base station or the mobile device in order to update their functionalities.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

The first control resource set may be specific to the communication device (e.g. a UE-specific search space, USS). Alternatively, the first control resource set may be shared among a plurality of communication devices (e.g. a common search space, CSS). The second control resource set may be specific to the communication device (e.g. a UE-specific search space, USS).

The first bandwidth may be smaller than the second bandwidth. The first control resource set may be provided across a first set of one or more time domain resources (e.g. slots) and the second control resource set may be provided across a second set of one or more time domain resources (e.g. slots), and the extent of the first set in the time domain may be different to (e.g. larger than) the extent of the second set in the time domain.

The first bandwidth may correspond to at least one of: a band defined in terms of a number of resource blocks (e.g. 4, 6, 8, or 24 resource blocks); a band defined in terms of frequency (1.4 MHz, 5 MHz, or 10 MHz); a band defined in terms of a bandwidth of a synchronisation signal transmitted by the base station.

The at least one of the monitoring for control data transmitted using the first control resource set and the monitoring for control data transmitted using a second control resource set may comprise monitoring for control data (e.g. downlink control information, DCI) that specifies whether the communication device is being scheduled for communications in a current transmission opportunity.

The method may further comprise: receiving control data transmitted using at least one of said first and second control resource set when monitoring for that control data; and communicating (e.g. sending and/or receiving) user data based on the received control data (e.g. over a Physical Downlink Shared Channel, PDSCH) using a bandwidth substantially equal to the first or second bandwidth in which the control data was transmitted.

The first control resource set may comprise an aggregation of a plurality of smaller control resource sets in the time domain. The second control resource set may comprise an aggregation of a plurality of control resource sets in the frequency domain (and optionally in the time domain).

The method may further comprise identifying the first control resource set prior to said monitoring for control data transmitted using the first control resource set.

The identifying of the first control resource set may be based on information associated with the communication device (e.g. using the formula 'UEID mod N', wherein 'N' represents the total number of control resource set in a system bandwidth of the base station and 'UEID' represents the information associated with the communication device).

The identifying of the first control resource set may be based on at least one physical random access channel (PRACH) resource associated with the communication device.

The identifying of the first control resource set may be based on a pseudo-random or hashing function.

The method may further comprise identifying the second control resource, prior to said monitoring for control data transmitted using the second control resource set, based on the first control resource set.

The first and second monitoring opportunities may occur at different periods in the time domain.

The first bandwidth may be small relative to the second bandwidth and the first DRX configuration may represent a DRX pattern having an on period that is long relative to the second DRX configuration (and/or the first DRX configuration may represent a DRX pattern having an off period that is short relative to the second DRX configuration).

The communication device may be configured not to monitor for control data in the monitoring opportunity associated with at least one other beam, during the on period of the DRX pattern.

The method may further comprise communicating (e.g. sending and/or receiving) user data based on the transmitted control data (e.g. over a Physical Downlink Shared Channel, PDSCH) using a bandwidth substantially equal to the first or second bandwidth in which the control data was transmitted.

The base station may comprise a base station of a next generation (NextGen or 5G) radio access network.

Various other modifications will be apparent to those skilled in the art and will not be described in further detail here.

The whole or part of the example embodiments disclosed above can be described as, but not limited to, the following supplementary notes.

(Supplementary Note 1)

A method performed by a communication device in a communication system comprising a base station serving an associated communication area, the method comprising:
communicating using a first bandwidth;
monitoring for control data transmitted, by the base station, using a first control resource set conveyed in the first bandwidth;
switching to using a second bandwidth for said communicating, wherein the second bandwidth is different to the first bandwidth; and
monitoring for control data transmitted, by the base station, using a second control resource set that is conveyed in the second bandwidth.

(Supplementary Note 2)

The method according to Supplementary note 1, wherein the first control resource set is specific to the communication device (e.g. a UE-specific search space, USS).

(Supplementary Note 3)

The method according to Supplementary note 1, wherein the first control resource set is shared among a plurality of communication devices (e.g. a common search space, CSS).

(Supplementary Note 4)

The method according to any one of Supplementary notes 1 to 3, wherein the second control resource set is specific to the communication device (e.g. a UE-specific search space, USS).

(Supplementary Note 5)

The method according to any one of Supplementary note 1 to 4, wherein the first bandwidth is smaller than the second bandwidth.

(Supplementary Note 6)

The method according to any one of Supplementary notes 1 to 5, wherein the first control resource set is provided across a first set of one or more time domain resources (e.g. slots) and the second control resource set is provided across a second set of one or more time domain resources (e.g. slots), wherein the extent of the first set in the time domain is different to (e.g. larger than) the extent of the second set in the time domain.

(Supplementary Note 7)

The method according to any one of Supplementary notes 1 to 6, wherein the first bandwidth corresponds to at least one of: a band defined in terms of a number of resource blocks (e.g. 4, 6, 8, or 24 resource blocks); a band defined in terms of frequency (1.4 MHz, 5 MHz, or 10 MHz); a band defined in terms of a bandwidth of a synchronisation signal transmitted by the base station.

(Supplementary Note 8)

The method according to any one of Supplementary notes 1 to 7, wherein at least one of: the monitoring for control data transmitted using the first control resource set; and the monitoring for control data transmitted using a second control resource set; comprises monitoring for control data (e.g. downlink control information, DCI) that specifies whether the communication device is being scheduled for communications in a current transmission opportunity.

(Supplementary Note 9)

The method according to any one of Supplementary notes 1 to 8, further comprising: receiving control data transmitted using at least one of said first and second control resource set when monitoring for that control data; and communicating (e.g. sending and/or receiving) user data based on the received control data (e.g. over a Physical Downlink Shared Channel, PDSCH) using a bandwidth substantially equal to the first or second bandwidth in which the control data was transmitted.

(Supplementary Note 10)

The method according to any one of Supplementary notes 1 to 9, wherein the first control resource set comprises an aggregation of a plurality of smaller control resource sets in the time domain.

(Supplementary Note 11)

The method according to any one of Supplementary notes 1 to 10, wherein the second control resource set comprises an aggregation of a plurality of control resource sets in the frequency domain (and optionally in the time domain).

(Supplementary Note 12)

The method according to any one of Supplementary notes 1 to 11, wherein the communication area is formed by a plurality of directional beams each covering a respective portion of the communication area.

(Supplementary Note 13)

The method according to any one of Supplementary notes 1 to 12, further comprising identifying the first control resource set prior to said monitoring for control data transmitted using the first control resource set.

(Supplementary Note 14)

The method according to Supplementary note 13, wherein the identifying of the first control resource set is based on information associated with the communication device (e.g. using the formula 'UEID mod N', wherein 'N' represents the total number of control resource set in a system bandwidth of the base station and 'UEID' represents the information associated with the communication device).

(Supplementary Note 15)

The method according to Supplementary note 13, wherein the identifying of the first control resource set is based on at least one physical random access channel, PRACH, resource associated with the communication device.

(Supplementary Note 16)

The method according to Supplementary note 13, wherein the identifying of the first control resource set is based on a pseudo-random or hashing function.

(Supplementary Note 17)

The method according to any one of Supplementary notes 13 to 16, further comprising identifying the second control resource, prior to said monitoring for control data transmitted using the second control resource set, based on the first control resource set.

(Supplementary Note 18)

A method performed by a communication device in a communication system comprising a base station serving an associated communication area formed by a plurality of directional beams, the method comprising:
- monitoring, in a first monitoring opportunity, for control data transmitted, by the base station, using a first beam;
- monitoring, in a second monitoring opportunity, for control data transmitted, by the base station, using a second beam;
- receiving control data transmitted using at least one of: the first beam in the first monitoring opportunity; and the second beam in the second monitoring opportunity; and
- identifying a serving beam based on reception of the control data.

(Supplementary Note 19)

The method according to Supplementary note 18, wherein the first and second monitoring opportunities occur at different periods in the time domain.

(Supplementary Note 20)

A method performed by a communication device in a communication system comprising a base station serving an associated communication area formed by a plurality of directional beams, the method comprising:
- receiving first control data transmitted, by the base station, using a first beam;
- receiving second control data transmitted, by the base station, using a second beam;
- wherein said second control data is a duplication of said first control data.

(Supplementary Note 21)

A method performed by a communication device in a communication system comprising a base station serving an associated communication area, the method comprising:
- communicating using a first bandwidth in accordance with a first discontinuous reception, DRX, configuration;
- switching to using a second bandwidth for said communicating, wherein the second bandwidth is different to the first bandwidth; and
- communicating using the second bandwidth in accordance with a second DRX configuration;
- wherein the first DRX configuration represents a different DRX pattern to the second DRX configuration.

(Supplementary Note 22)

The method according to Supplementary note 21, wherein the first bandwidth is small relative to the second bandwidth and the first DRX configuration represents a DRX pattern having an on period that is long relative to the second DRX configuration (and/or the first DRX configuration represents a DRX pattern having an off period that is short relative to the second DRX configuration).

(Supplementary Note 23)

A method performed by a communication device in a communication system comprising a base station serving an associated communication area formed by a plurality of directional beams wherein each beam has an associated monitoring opportunity during which the base station may transmit control data, the method comprising:
- communicating in accordance with a discontinuous reception, DRX, pattern having an on period and an off period; and
- monitoring for control data transmitted, by the base station, using at least one beam in a monitoring opportunity associated with the at least one beam, based on the DRX pattern;
- wherein the communication device monitors for control data in the monitoring opportunity associated with the at least one beam during the on period of the DRX pattern but does not monitor for control data in the monitoring opportunity during the off period of the DRX pattern.

(Supplementary Note 24)

The method according to Supplementary note 23, wherein, during the on period of the DRX pattern, the communication device does not monitor for control data in the monitoring opportunity associated with at least one other beam.

(Supplementary Note 25)

A method performed by a base station in a communication system in which the base station serves a communication area, the method comprising:
- communicating with a communication device using a first bandwidth;
- transmitting control data, to the communication device, using a first control resource set conveyed in the first bandwidth;
- switching to using a second bandwidth for said communicating, wherein the second bandwidth is different to the first bandwidth; and
- transmitting control data, to the communication device, using a second control resource set that is conveyed in the second bandwidth.

(Supplementary Note 26)

The method according to Supplementary note 25, wherein the first control resource set is provided across a first set of one or more time domain resources (e.g. slots) and the second control resource set is provided across a second set of one or more time domain resources (e.g. slots), wherein the extent of the first set in the time domain is different to (e.g. larger than) the extent of the second set in the time domain.

(Supplementary Note 27)

The method according to Supplementary note 25 or 26, further comprising communicating (e.g. sending and/or receiving) user data based on the transmitted control data (e.g. over a Physical Downlink Shared Channel, PDSCH) using a bandwidth substantially equal to the first or second bandwidth in which the control data was transmitted.

(Supplementary Note 28)

The method according to any one of Supplementary notes 25 to 27, wherein the first control resource set comprises an aggregation of a plurality of smaller control resource sets in the time domain.

(Supplementary Note 29)

The method according to any one of Supplementary notes 25 to 28, wherein the second control resource set comprises an aggregation of a plurality of control resource sets in the frequency domain (and optionally in the time domain).

(Supplementary Note 30)

The method according to any one of Supplementary notes 25 to 29, further comprising identifying the first control resource set prior to said transmitting the control data using the first control resource set.

(Supplementary Note 31)

The method according to any one of Supplementary note 25 to 30, wherein the base station comprises a base station of a next generation, NextGen, radio access network.

(Supplementary Note 32)

A method performed by a base station in a communication system in which the base station serves a communication area formed by a plurality of directional beams, the method comprising:
  monitoring, following transmission of control data using a first beam, for feedback from a communication device relating to the control data transmitted using the first beam;
  monitoring, following transmission of control data using a second beam, for feedback from a communication device relating to the control data transmitted using the second beam;
  receiving feedback from the communication device relating to at least one of: the control data transmitted using the first beam; and the control data transmitted using the second beam; and
  identifying a serving beam based on reception of the feedback.

(Supplementary Note 33)

The method according to Supplementary note 32, wherein the transmission of control data using a first beam and the transmission of control data using a second beam occur at different periods in the time domain.

(Supplementary Note 34)

A method performed by a base station in a communication system wherein the base station serves an associated communication area formed by a plurality of directional beams, the method comprising:
  transmitting first control data, to at least one communication device, using a first beam; and
  transmitting second control data, to the at least one communication device, using a second beam;
  wherein said second control data is a duplication of said first control data.

(Supplementary Note 35)

A method performed by a base station in a communication system in which the base station serves an associated communication area, the method comprising:
  communicating, with a communication device, using a first bandwidth in accordance with a first discontinuous reception, DRX, configuration;
  switching to using a second bandwidth for said communicating, wherein the second bandwidth is different to the first bandwidth; and
  communicating, with the communication device, using the second bandwidth in accordance with a second DRX configuration;
  wherein the first DRX configuration represents a different DRX pattern to the second DRX configuration.

(Supplementary Note 36)

The method according to Supplementary note 35, wherein the first bandwidth is small relative to the second bandwidth and the first DRX configuration represents a DRX pattern having an on period that is long relative to the second DRX configuration (and/or the first DRX configuration represents a DRX pattern having an off period that is short relative to the second DRX configuration).

(Supplementary Note 37)

A method performed by a base station in a communication system in which the base station serves an associated communication area formed by a plurality of directional beams wherein each beam has an associated monitoring opportunity during which the base station may transmit control data, the method comprising:
  communicating, with a communication device, in accordance with a discontinuous reception, DRX, pattern having an on period and an off period; and
  transmitting control data, to the communication device, using at least one beam in a transmission opportunity associated with the at least one beam, based on the DRX pattern, such that:
  control data is transmitted in the transmission opportunity associated with the at least one beam during the on period of the DRX pattern but not transmitted in the monitoring opportunity during the off period of the DRX pattern.

(Supplementary Note 38)

A communication device for a communication system comprising a base station serving a communication area formed by a plurality of directional beams, wherein the communication device comprises:
  a controller and a transceiver;
  wherein the transceiver is operable to communicate with the base station using a first bandwidth; and
  wherein the controller is operable to:
    monitor for control data transmitted, by the base station, using a first control resource set conveyed in the first bandwidth;
    switch the transceiver to using a second bandwidth for said communicating, wherein the second bandwidth is different to the first bandwidth; and
    monitor for control data transmitted, by the base station, using a second control resource set that is conveyed in the second bandwidth.

(Supplementary Note 39)

A communication device for a communication system comprising a base station serving a communication area formed by a plurality of directional beams, wherein the communication device comprises:

a controller and a transceiver;
wherein the controller is operable to:
monitor, in a first monitoring opportunity, for control data transmitted, by the base station, using a first beam;
monitor, in a second monitoring opportunity, for control data transmitted, by the base station, using a second beam;
wherein the transceiver is operable to receive control data transmitted using at least one of: the first beam in the first monitoring opportunity; and the second beam in the second monitoring opportunity; and
wherein the controller is operable to identify a serving beam based on reception of the control data.

(Supplementary Note 40)

A communication device for a communication system comprising a base station serving a communication area formed by a plurality of directional beams, wherein the communication device comprises:
a controller and a transceiver, wherein the transceiver is operable to:
receive first control data transmitted, by the base station, using a first beam; and
receive second control data transmitted, by the base station, using a second beam;
wherein said second control data is a duplication of said first control data.

(Supplementary Note 41)

A communication device for a communication system comprising a base station serving a communication area, wherein the communication device comprises:
a controller and a transceiver;
wherein the transceiver is operable to communicate using a first bandwidth in accordance with a first discontinuous reception, DRX, configuration;
wherein the controller is operable to switch the transceiver to using a second bandwidth for said communicating, wherein the second bandwidth is different to the first bandwidth; and
wherein the transceiver is operable to communicate using the second bandwidth in accordance with a second DRX configuration;
wherein the first DRX configuration represents a different DRX pattern to the second DRX configuration.

(Supplementary Note 42)

A communication device for a communication system comprising a base station serving an associated communication area formed by a plurality of directional beams wherein each beam has an associated monitoring opportunity during which the base station may transmit control data, the communication device comprising:
a controller and a transceiver;
wherein the controller is operable to:
control the transceiver to communicate in accordance with a discontinuous reception, DRX, pattern having an on period and an off period; and
monitor for control data transmitted, by the base station, using at least one beam in a monitoring opportunity associated with the at least one beam, based on the DRX pattern; and
wherein the controller is operable to monitor for control data in the monitoring opportunity associated with the at least one beam during the on period of the DRX pattern but the controller is operable to not monitor for control data in the monitoring opportunity during the off period of the DRX pattern.

(Supplementary Note 43)

A base station for a communication system in which the base station serves a communication area, wherein the base station comprises:
a controller and a transceiver;
wherein the transceiver is operable to:
communicate with a communication device using a first bandwidth; and
transmit control data, to the communication device, using a first control resource set conveyed in the first bandwidth;
wherein the controller is operable to switch the transceiver to using a second bandwidth for said communicating, wherein the second bandwidth is different to the first bandwidth; and
wherein the transceiver is operable to transmit control data, to the communication device, using a second control resource set that is conveyed in the second bandwidth.

(Supplementary Note 44)

A base station for a communication system in which the base station serves a communication area formed by a plurality of directional beams, wherein the base station comprises:
a controller and a transceiver;
wherein the controller is operable to:
monitor, following transmission of control data using a first beam, for feedback from a communication device relating to the control data transmitted using the first beam;
monitor, following transmission of control data using a second beam, for feedback from a communication device relating to the control data transmitted using the second beam;
wherein the transceiver is operable to receive feedback from the communication device relating to at least one of: the control data transmitted using the first beam; and the control data transmitted using the second beam; and
wherein the controller is operable to identify a serving beam based on reception of the feedback.

(Supplementary Note 45)

A base station for a communication system in which the base station serves a communication area formed by a plurality of directional beams, wherein the base station comprises:
a controller and a transceiver;
wherein the transceiver is operable to:
transmit first control data, to at least one communication device, using a first beam; and
transmit second control data, to the at least one communication device, using a second beam;
wherein said second control data is a duplication of said first control data.

(Supplementary Note 46)

A base station for a communication system in which the base station serves a communication area, wherein the base station comprises:
a controller and a transceiver;
wherein the transceiver is operable to communicate, with a communication device, using a first bandwidth in accordance with a first discontinuous reception, DRX, configuration;
wherein the controller is operable to switch the transceiver to using a second bandwidth for said communicating, wherein the second bandwidth is different to the first bandwidth; and wherein the transceiver is operable to communicate, with the communication device, using the second bandwidth in accordance with a second DRX configuration;

wherein the first DRX configuration represents a different DRX pattern to the second DRX configuration.

(Supplementary Note 47)

A system comprising the communication device according to any one of Supplementary notes 38 to 42 and the base station according to any one of Supplementary notes 43 to 46.

(Supplementary Note 48)

A computer implementable instructions product comprising computer implementable instructions for causing a programmable communications device to become configured as the communication device according to any one of Supplementary notes 38 to 42.

(Supplementary Note 49)

A computer implementable instructions product comprising computer implementable instructions for causing a programmable communications device to become configured as the base station according to any one of Supplementary notes 43 to 46.

This application is based upon and claims the benefit of priority from United Kingdom patent application No. 1704762.2, filed on Mar. 24, 2017, the disclosures of which are incorporated herein in their entirety by reference.

The invention claimed is:

1. A method performed by a user equipment (UE), the method comprising:
communicating, with a base station, using a first bandwidth part having a first bandwidth;
monitoring for control data transmitted, by the base station, using a first control resource set associated with a common search space (CSS), wherein the first control resource set is conveyed in the first bandwidth part;
changing to using a second bandwidth part having a second bandwidth for the communicating, wherein the second bandwidth is different from the first bandwidth; and
monitoring for control data transmitted, by the base station, using a second control resource set associated with a CSS wherein the second control resource set is conveyed in the second bandwidth part,
wherein the second control resource set is different from the first control resource set in a frequency domain, and
respective frequency resource blocks of the first and second control resource sets are configured based on the respective first and second bandwidths.

2. The method according to claim 1, wherein
the changing is performed based on at least one of:
downlink control information (DCI);
an expiry of an inactive timer for a respective bandwidth part;
a Media Access Control-Control Element (MAC-CE); and
a Radio Resource Control (RRC) signaling.

3. The method according to claim 1, wherein
the first control resource set includes a control resource set for initial access, and the method further comprises:
receiving information for the control resource set for the initial access via a Master Information Block (MIB) or system information.

4. The method according to claim 1, further comprising:
receiving information for location of one of the first control resource set and the second control resource set, and
monitoring for the control data using the information for the location of the one of the first control resource set and the second control resource set.

5. The method according to claim 1, wherein respective time durations of the first control resource set and the second control resource set are at least one of 1, 2, and 3 symbols.

6. A method performed by a base station, the method comprising:
communicating with a user equipment (UE) using a first bandwidth part having a first bandwidth;
transmitting control data, to the UE, using a first control resource set associated with a common search space (CSS), wherein the first control resource set is conveyed in the first bandwidth part;
changing to using a second bandwidth part having a second bandwidth for the communicating, wherein the second bandwidth is different from the first bandwidth; and
transmitting control data, to the UE, using a second control resource set associated with a CSS, wherein the second control resource set is conveyed in the second bandwidth part,
wherein at least a part of the second control resource set is different from at least a part of the first control resource set in a frequency domain, and
respective frequency resource blocks of the first and second control resource sets are configured based on the respective first and second bandwidths.

7. The method according to claim 6, wherein
the changing is performed based on at least one of:
downlink control information (DCI);
an expiry of an inactive timer for a respective bandwidth part;
a Media Access Control-Control Element (MAC-CE); and
a Radio Resource Control (RRC) signaling.

8. The method according to claim 6, wherein
the first control resource set includes a control resource set for initial access, and the method further comprises:
transmitting information for the control resource set for the initial access via a Master Information Block (MIB) or system information.

9. The method according to claim 6, further comprising:
transmitting information for location of one of the first control resource set and the second control resource set, and
transmitting the control data using the information for the location of the one of the first control resource set and the second control resource set.

10. The method according to claim 6, wherein respective time durations of the first control resource set and the second control resource set are at least one of 1, 2, and 3 symbols.

11. A user equipment (UE) comprising:
a controller and a transceiver;
wherein the controller is configured to:
control the transceiver to communicate with a base station using a first bandwidth part having a first bandwidth,
monitor for control data transmitted, by the base station, using a first control resource set associated with a common search space (CSS), wherein the first control resource set is conveyed in the first bandwidth part;
control the transceiver to change to using a second bandwidth part having a second bandwidth for the communicating, wherein the second bandwidth is different from the first bandwidth; and monitor for control data transmitted, by the base station, using a second control resource set associated with a CSS wherein the second control resource set is conveyed in the second bandwidth part, wherein the second control resource set is different from the first control resource set in a frequency domain, and respective frequency resource blocks of the first and second control resource sets are configured based on the respective first and second bandwidths.

12. A base station comprising:

a controller and a transceiver;

wherein the controller is configured to:

control the transceiver to communicate with a user equipment (UE), using a first bandwidth part having a first bandwidth, control the transceiver to transmit control data, to the UE, using a first control resource set associated with a common search space (CSS), wherein the first control resource set is conveyed in the first bandwidth part, change to using a second bandwidth part having a second bandwidth for the communicating, wherein the second bandwidth is different from the first bandwidth, and control the transceiver to transmit control data, to the UE, using a second control resource set associated with a CSS, wherein the second control resource set is conveyed in the second bandwidth part, and wherein the second control resource set is different from the first control resource set in a frequency domain, and respective frequency resource blocks of the first and second control resource sets are configured based on the respective first and second bandwidths.

* * * * *